(12) United States Patent
Na et al.

(10) Patent No.: US 11,340,676 B2
(45) Date of Patent: May 24, 2022

(54) METHOD OF IDENTIFYING EXTERNAL ELECTRONIC DEVICE BASED ON POWER INFORMATION AND ELECTRONIC DEVICE AND STORAGE MEDIUM FOR SUPPORTING SAME

(71) Applicant: Samsung Electronics Co., Ltd., Suwon-si (KR)

(72) Inventors: Sejeong Na, Suwon-si (KR); Hyunjin Bae, Suwon-si (KR); Siyoul Choi, Suwon-si (KR); Hoseong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 16/520,830

(22) Filed: Jul. 24, 2019

(65) Prior Publication Data

US 2020/0073455 A1 Mar. 5, 2020

(30) Foreign Application Priority Data

Sep. 3, 2018 (KR) .......................... 10-2018-0104593

(51) Int. Cl.
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
CPC .... G06F 1/266; G06F 13/4282; G06F 13/385; G06F 13/4068; G06F 1/263; G06F 1/32;

(Continued)

(56) References Cited

U.S. PATENT DOCUMENTS 7,711,870 B2 * 5/2010 Yoshida .............. G06F 13/4295
710/16
2006/0053318 A1 * 3/2006 One ...................... G06F 1/3284
713/300

(Continued)

OTHER PUBLICATIONS

Enos et al., "A Primer on USB Type-C and USB Power Delivery Applications and Requirements", Feb. 2021, Texas Instruments, entire document.*

(Continued)

*Primary Examiner* — Faisal M Zaman
(74) *Attorney, Agent, or Firm* — Jefferson IP Law, LLP

(57) ABSTRACT

An electronic device is provided. The electronic device includes a connector including one or more signal terminals for communication with an external electronic device, at least one processor operatively connected to the connector, and a memory operatively connected to the processor, the memory stores instructions, when executed by the at least one processor, cause the at least one processor to identify a connection to the external electronic device through the connector, receive one or more pieces of information about power that is supported by the external electronic device from the external electronic device in the connection to the external electronic device through the connector, and identify the external electronic device, based on a part of the one or more pieces of power information. Other embodiments are possible.

16 Claims, 21 Drawing Sheets

(58) Field of Classification Search
CPC ........ G06F 1/26; G06F 1/3215; G06F 1/3296; G06F 2212/2146; G06F 2213/0042; G06F 1/3253; G06F 1/3278; G06F 13/12; G06F 13/382; Y02D 10/00; H02J 2310/22; H02J 7/00034; H04L 12/10; H04L 12/40045
USPC ............................ 710/16; 713/310, 324, 340
See application file for complete search history.

(56) References Cited

U.S. PATENT DOCUMENTS

| | | | |
|---|---|---|---|
| 2009/0049268 A1* | 2/2009 | Kim ........................ | G06F 21/10 711/170 |
| 2009/0122006 A1* | 5/2009 | Nielsen ................... | G06F 3/016 345/156 |
| 2009/0313493 A1 | 12/2009 | Ide | |
| 2009/0327572 A1* | 12/2009 | Cho ..................... | G06F 13/4291 711/5 |
| 2013/0290765 A1* | 10/2013 | Waters .................... | G06F 1/266 713/340 |
| 2014/0103864 A1 | 4/2014 | Song | |
| 2014/0208134 A1* | 7/2014 | Waters ................ | G06F 13/4282 713/310 |
| 2015/0220139 A1* | 8/2015 | Puthillathe ............ | G06F 13/385 713/323 |
| 2015/0346792 A1 | 12/2015 | Rathi et al. | |
| 2016/0026551 A1* | 1/2016 | Kim ................... | G06F 11/3041 713/340 |
| 2016/0127671 A1* | 5/2016 | Hundal ............ | H04N 21/43632 348/723 |
| 2016/0188514 A1* | 6/2016 | Forghani-Zadeh ..... | G06F 1/266 710/313 |
| 2016/0216750 A1* | 7/2016 | Hundal ............... | G06F 13/4282 |
| 2016/0282406 A1* | 9/2016 | Park ..................... | G01R 21/133 |
| 2017/0031403 A1* | 2/2017 | Waters .................... | G06F 1/266 |
| 2017/0031859 A1* | 2/2017 | Igarashi ............. | G06F 13/4068 |
| 2017/0047908 A1* | 2/2017 | Yeh ........................ | H03H 11/28 |
| 2017/0139871 A1* | 5/2017 | Yeh ..................... | G06F 13/4081 |
| 2017/0185126 A1* | 6/2017 | Trethewey .............. | H02J 50/80 |
| 2017/0279270 A1* | 9/2017 | Motoki ................... | H01B 11/02 |
| 2017/0293335 A1* | 10/2017 | Dunstan .................... | H02J 7/00 |
| 2017/0317583 A1* | 11/2017 | Forghani-Zadeh ...... | H03K 5/08 |
| 2017/0358947 A1* | 12/2017 | Waters .................. | G05B 15/02 |
| 2018/0004279 A1* | 1/2018 | Matsui .................. | G06F 1/3212 |
| 2018/0060270 A1* | 3/2018 | Schnell ............. | G06F 13/4022 |
| 2018/0143927 A1* | 5/2018 | Kim ..................... | G06F 13/385 |
| 2018/0183340 A1* | 6/2018 | Waters .................... | H02M 1/36 |
| 2018/0219399 A1* | 8/2018 | Balakrishnan .... | H02J 7/007184 |
| 2018/0321725 A1* | 11/2018 | Shao .................. | G06F 1/3206 |
| 2018/0373216 A1* | 12/2018 | Chang ................... | G01R 31/66 |
| 2019/0341786 A1* | 11/2019 | Lee ........................ | H02J 7/0021 |
| 2020/0033924 A1* | 1/2020 | Waters .................... | G06F 1/266 |

OTHER PUBLICATIONS

"Overview of USB Type-C and Power Delivery Technologies", May 2018, STMicroelectronics, TA0357 Rev 1, entire document.*
Rogers, Andrew, "AN1953: Introduction to USB Type-C", 2015, Microchip Technology, entire document.*
International Search Report dated Oct. 30, 2019, issued in International Application No. PCT/KR2019/009396.
International Standard, Universal Serial Bus Interfaces for Data and Power Part 1-2 Common Components USB Power Delivery Specification, IEC 62680-1-2, Apr. 12, 2018.
Extended European Search Report dated Sep. 6, 2021, issued in European Patent Application No. 19858400.5.

* cited by examiner

| | PIN No. | Signal Name | Note |
|---|---|---|---|
| 511a,511b | 1 | GND | Ground |
| 512a,512b | 2 | TX+ | Super speed TX positive |
| 513a,513b | 3 | TX- | Super speed TX negative |
| 514a,514b | 4 | V$_{BUS}$ | Usb Cable Charging Power |
| 515a,515b | 5 | CC | Identification Terminal |
| 516a,516b | 6 | D+ | + line of the differential bi-directional USB signal |
| 517a,517b | 7 | D- | - line of the differential bi-directional USB signal |
| 518a,518b | 8 | SBU | Side Band Use : additional purpose pin (ex: Audio signal, display signal, etc) |
| 519a,519b | 9 | V$_{BUS}$ | Usb Cable Charging Power |
| 520a,520b | 10 | RX- | Super speed RX negative |
| 521a,521b | 11 | RX+ | Super speed TX positive |
| 522a,522b | 12 | GND | Ground |

FIG.5B

| | Bit(s) | Field Name | Data | Description |
|---|---|---|---|---|
| Message Header (715) | 15 | Extended | 0h | Control or Data Message |
| | 14...12 | Number of Data Objects | 3h | |
| | 11...9 | MessageID | 0h | |
| | 8 | Port Power Role | 1h | Source |
| | 7...6 | Specification Revision | 1h | Revision 2.0 |
| | 5 | Port Data Role | 1h | DFP |
| | 4...0 | Message Type | 0h | Source_Capabilities |
| Power Data Object (805) | 31...30 | Fixed Supply | 0h | |
| | 29 | Dual-Role Power | 0h | |
| | 28 | USB Suspend Supported | 0h | |
| | 27 | Unconstrained Power | 1h | |
| | 26 | USB Communications Capable | 0h | |
| | 25 | Dual-Role Data | 0h | |
| | 24 | Unchunked Extended Messages Supported | 0h | |
| | 23...22 | Reserved | 0h | |
| | 21...20 | Peak Current | 0h | |
| | 19...10 | Voltage in 50mV unit | 064h | 5000mV |
| | 9...0 | Maximum Current in 10mA unit | 0F0h | 2400mA |
| Power Data Object | 31...30 | Fixed Supply | 0h | |
| | 29 | Dual-Role Power | 0h | |
| | 28 | USB Suspend Supported | 0h | |
| | 27 | Unconstrained Power | 0h | |
| | 26 | USB Communications Capable | 0h | |
| | 25 | Dual-Role Data | 0h | |
| | 24 | Unchunked Extended Messages Supported | 0h | |
| | 23...22 | Reserved | 0h | |
| | 21...20 | Peak Current | 0h | |
| | 19...10 | Voltage in 50mV unit | 128h | 14800mV |
| | 9...0 | Maximum Current in 10mA unit | 0C8h | 2000mA |
| Power Data Object (810) | 31...30 | Fixed Supply | 0h | |
| | 29 | Dual-Role Power | 0h | |
| | 28 | USB Suspend Supported | 0h | |
| | 27 | Unconstrained Power | 0h | |
| | 26 | USB Communications Capable | 0h | |
| | 25 | Dual-Role Data | 0h | |
| | 24 | Unchunked Extended Messages Supported | 0h | |
| | 23...22 | Reserved | 0h | |
| | 21...20 | Peak Current | 0h | |
| | 19...10 | Voltage in 50mV unit | 065h | 5050mV |
| | 9...0 | Maximum Current in 10mA unit | 0C8h | 10mA |

FIG.8A

| | Bit(s) | Field Name | Data | Description |
|---|---|---|---|---|
| Message Header | 15 | Extended | 0h | Control or Data Message |
| | 14...12 | Number of Data Objects | 3h | |
| | 11...9 | MessageID | 0h | |
| | 8 | Port Power Role | 1h | Source |
| | 7...6 | Specification Revision | 1h | Revision 2.0 |
| | 5 | Port Data Role | 1h | DFP |
| | 4...0 | Message Type | 0h | Source_Capabilities |
| Power Data Object | 31...30 | Fixed Supply | 0h | |
| | 29 | Dual-Role Power | 0h | |
| | 28 | USB Suspend Supported | 0h | |
| | 27 | Unconstrained Power | 1h | |
| | 26 | USB Communications Capable | 0h | |
| | 25 | Dual-Role Data | 0h | |
| | 24 | Unchunked Extended Messages Supported | 0h | |
| | 23...22 | Reserved | 0h | |
| | 21...20 | Peak Current | 0h | |
| | 19...10 | Voltage in 50mV unit | 064h | 5000mV |
| | 9...0 | Maximum Current in 10mA unit | 0F0h | 2400mA |
| Power Data Object | 31...30 | Fixed Supply | 0h | |
| | 29 | Dual-Role Power | 0h | |
| | 28 | USB Suspend Supported | 0h | |
| | 27 | Unconstrained Power | 0h | |
| | 26 | USB Communications Capable | 0h | |
| | 25 | Dual-Role Data | 0h | |
| | 24 | Unchunked Extended Messages Supported | 0h | |
| | 23...22 | Reserved | 0h | |
| | 21...20 | Peak Current | 0h | |
| | 19...10 | Voltage in 50mV unit | 128h | 14800mV |
| | 9...0 | Maximum Current in 10mA unit | 0C8h | 2000mA |
| Power Data Object | 31...30 | Fixed Supply | 0h | |
| | 29 | Dual-Role Power | 0h | |
| | 28 | USB Suspend Supported | 0h | |
| | 27 | Unconstrained Power | 0h | |
| | 26 | USB Communications Capable | 0h | |
| | 25 | Dual-Role Data | 0h | |
| | 24 | Unchunked Extended Messages Supported | 0h | |
| | 23...22 | Reserved | 1h | |
| | 21...20 | Peak Current | 0h | |
| | 19...10 | Voltage in 50mV unit | 065h | 5050mV |
| | 9...0 | Maximum Current in 10mA unit | 001h | 10mA |

FIG.8F

| DEVICE 1210 | | | | |
|---|---|---|---|---|
| CC-PD ~1230 | DP ~1240 | Codec ~1260 | | USB ~1250 |
| COMPLETE POWER NEGOTIATION AND DETECT TYPE OF HOST DEVICE (PC, 48KHz/16bit) ~1264 | | | | |
| ENTER ALTERNATE MODE | BRIDGE IC INITIATION | Codec Init (with 48KHz/16bit BitDepth/Sampling Rate) ~1263 | | |
| | WRITE EDID OF 48KHz/16bit IN EDID DATA BUFFER DPCD setting (RX configuration) ~1261 | | | USB init |
| | | | | enumeration |
| TRANSMIT HPD ATTENTION THROUGH CC-PD | DISPLAY ON & AUDIO OUTPUT ~1262 | Codec init done | | |
| | | | | PERFORM HID COMMUNICATION |

FIG.12B

METHOD OF IDENTIFYING EXTERNAL ELECTRONIC DEVICE BASED ON POWER INFORMATION AND ELECTRONIC DEVICE AND STORAGE MEDIUM FOR SUPPORTING SAME

CROSS-REFERENCE TO RELATED APPLICATION(S)

This application is based on and claims priority under 35 U.S.C. § 119 of a Korean patent application number 10-2018-0104593, filed on Sep. 3, 2018, in the Korean Intellectual Property Office, the disclosure of which is incorporated by reference herein in its entirety.

BACKGROUND

1. Field

The disclosure relates to a method of recognizing an external electronic device when a connection with the external electronic device is made, and an electronic device for supporting the same.

2. Description of Related Art

Recently, the use of electronic devices that can be easily carried, such as smartphones, tablet personal computers (PCs), and wearable devices, has increased, and the electronic devices may be configured to perform various functions. For example, various functions such as voice communication, Internet search, taking photos or videos, music playback, and video viewing may be performed using such electronic devices.

Such electronic devices may be connected to various other external electronic devices, and may receive data from the external electronic devices or transmit data to the external electronic devices. Accordingly, the electronic device may transmit content to an external electronic device such as a television (TV) through a connector used to perform charging or input/output data. For example, when the electronic device is connected to the TV through the connector on the basis of Universal Serial Bus (USB)-Power Delivery (PD) communication, the electronic device may be designated as a host (or a master) and the TV may be designated as a client (or a slave).

As described above, when the electronic device is physically connected to the external electronic device through the connector, the roles of the host and/or the client may be determined. For example, when the electronic device is connected to the external electronic device through the connector, the electronic device may transmit a screen of a display to the external electronic device (for example, a TV) so that the external electronic device may display the screen of the display, but the external electronic device may communicate with the electronic device through settings corresponding to the type of the electronic device only when the external electronic device knows the type of the electronic device.

To this end, when the external electronic device (for example, a TV) serving as the client desires to identify the type of the electronic device (for example, a smartphone) serving as the host, a discovery identity message according to a method specified in the USB-PD communication standard may be used to identify the type of the connected electronic device.

The above information is presented as background information only to assist with an understanding of the disclosure. No determination has been made, and no assertion is made, as to whether any of the above might be applicable as prior art with regard to the disclosure.

SUMMARY

Since a discovery identity message can be transmitted only to a client device from a host device, only an electronic device (for example, a smartphone) serving as a host can identify a connected external electronic device (for example, a television (TV)).

When the external electronic device (for example, a TV) operating as a client desires to transmit a discovery identity message in order to identify the type of the connected electronic device (for example, a smartphone), the roles of the host and the client should be exchanged and then the original roles should be restored. Accordingly, before a discovery identity message is transmitted, a data role swap message should be transmitted in a method according to the Universal Serial Bus (USB)-Power Delivery (PD) communication standard to swap the roles. After device identification, a process of exchanging the data role swap message should be performed in order to restore the original roles, so that the above-described large number of steps is necessary in order to simply identifying a connected device, and thus screen flickering or screen noise may be generated in an external electronic device (for example, a TV) due to the generation of a delay time.

Further, after identification of the type of the connected device, the process of exchanging the data role swap message according to the method specified in the USB-PD communication standard should be performed in order to restore the original roles.

Accordingly, when an electronic device is connected to an external electronic device through a USB type C connector, a method by which the electronic device operating in a client mode rapidly identifies the type of the external electronic device operating in a host mode is needed.

Aspects of the disclosure are to address at least the above-mentioned problems and/or disadvantages and to provide at least the advantages described below. Accordingly, an aspect of the disclosure is to provide an apparatus and method for a method by which the electronic device operating in a client mode rapidly identifies the type of the external electronic device operating in a host mode is needed.

Additional aspects will be set forth in part in the description which follows and, in part, will be apparent from the description, or may be learned by practice of the presented embodiments.

In accordance with an aspect of the disclosure, an electronic device is provided. The electronic device includes a connector including one or more signal terminals for communication with an external electronic device, at least one processor operatively connected to the connector, and a memory operatively connected to the at least one processor, wherein the memory stores instructions causing the at least one processor, when executed, to identify a connection to the external electronic device through the connector, receive one or more pieces of power information that can be supported by the external electronic device from the external electronic device in the connection to the external electronic device through the connector, and identify the external electronic device, based on a part of the one or more pieces of power information.

In accordance with another aspect of the disclosure, a method of identifying an external electronic device by an electronic device, based on power information is provided. The method includes identifying a connection to an external electronic device through a connector including one or more signal terminals for communication with the external electronic device, receiving one or more pieces of power information that is supported by the external electronic device from the external electronic device in the connection to the external electronic device through the connector, and identifying the external electronic device, based on a part of the one or more pieces of power information.

In accordance with another aspect of the disclosure, an electronic device is provided. The electronic device includes a connector including one or more signal terminals for communication with an external electronic device, at least one processor operatively connected to the connector, and a memory operatively connected to the at least one processor, wherein the memory stores instructions, when executed by the at least one processor, causing the at least one processor, when executed, to identify a connection to the external electronic device through the connector, transmit one or more pieces of power information including predetermined power information for identifying the electronic device to the external electronic device in the connection to the external electronic device through the connector, transmit a power supply preparation message when a power request message including selected power information is received from the external electronic device, and perform a power negotiation step, based on the power request message.

In accordance with another aspect of the disclosure, a method of identifying an external electronic device by an electronic device, based on power information is provided. The method includes identifying a connection to the external electronic device through a connector including one or more signal terminals, transmitting one or more pieces of power information including predetermined power information for identifying the electronic device to the external electronic device in the connection to the external electronic device through the connector, transmitting a power supply preparation message when a power request message including selected power information is received from the external electronic device, and performing a power negotiation step, based on the power request message.

In accordance with another aspect of the disclosure, a storage medium having instructions stored therein is provided. The instructions may be configured to cause at least one circuit to, when executed by the at least one circuit, perform at least one operation. The at least one operation includes identifying a connection to an external electronic device through a connector including one or more signal terminals for communication with the external electronic device, receiving one or more pieces of power information that is supported by the external electronic device from the external electronic device in the connection to the external electronic device through the connector, and identifying the external electronic device, based on a part of the one or more pieces of power information.

According to various embodiments, when an electronic device is connected to an external electronic device through a USB type C connector, the electronic device operating in a client mode may rapidly identify the type of the external electronic device operating in a host mode.

According to various embodiments, in the case of the electronic device operating in the host mode and the external electronic device operating in the client mode, the electronic device does not need to perform an operation of swapping the host role and the client role with the external electronic device in order to identify the type of the external electronic device, so that the step for device identification may be simplified and thus the communication time may be reduced.

According to various embodiments, a method of simply identifying the external electronic device without any change in a PD communication scheme based on USB-PD communication specifications may be implemented by adding a Power Data Object (PDO) for identification information of the external electronic device to a PDO in which power information is configured.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B illustrates pins of a connector according to various embodiments of the disclosure;

FIG. 8A illustrates one or more pieces of power information carried on a PD message according to various embodiments of the disclosure;

FIG. 8F illustrates one or more pieces of power information carried on a PD message according to various embodiments of the disclosure;

FIG. 12B illustrates an operation for audio communication in the client device after the power negotiation step and in the power negotiation step according to various embodiments of the disclosure.

Throughout the drawings, like reference numerals will be understood to refer to like parts, components, and structures.

DETAILED DESCRIPTION

Figure 1:
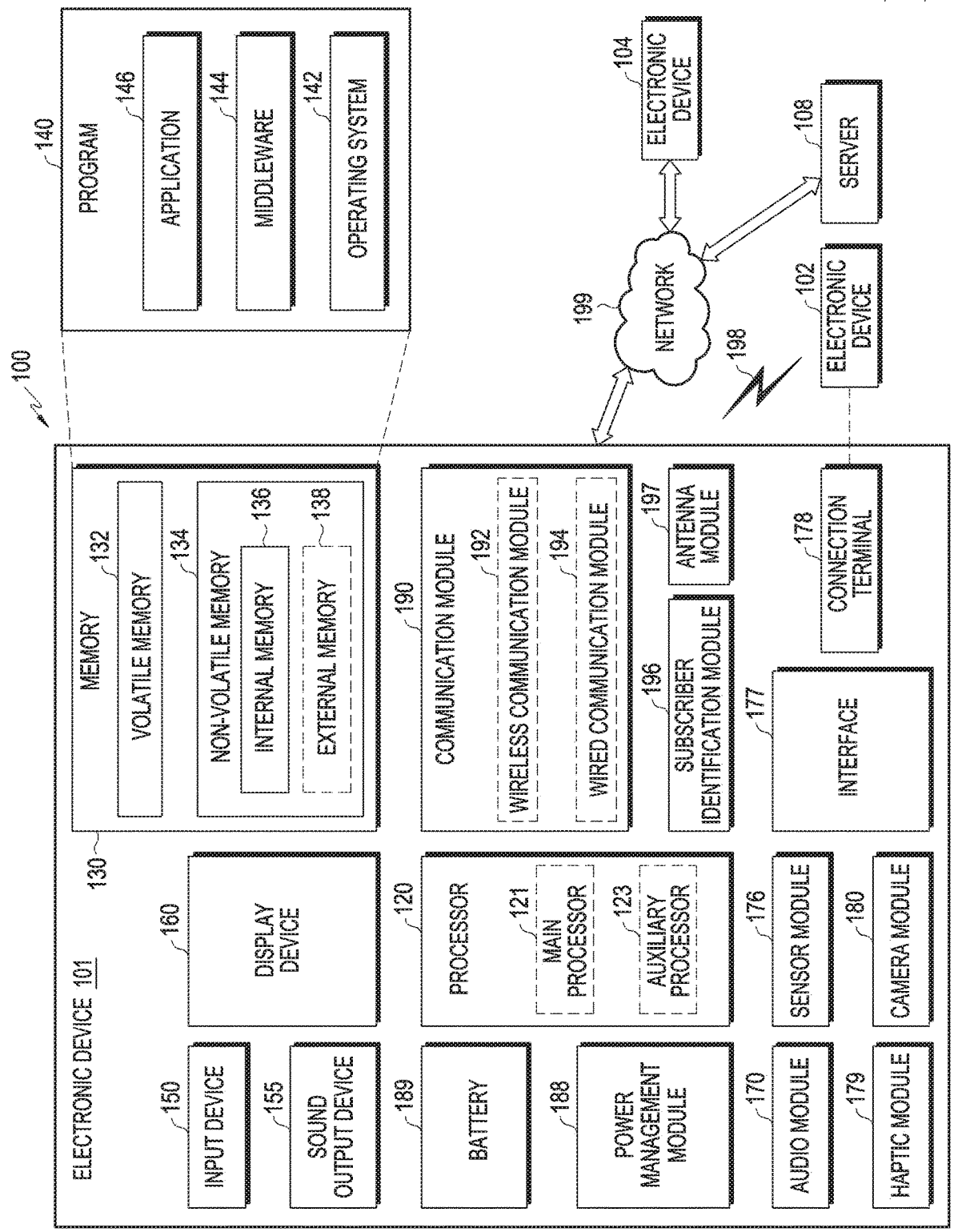
FIG. 1 is a block diagram of an electronic device within a network environment for recognizing an external electronic device on the basis of power information according to various embodiments of the disclosure.

Hereinafter, various embodiments of the disclosure will be described with reference to the accompanying drawings. However, it should be understood that there is no intent to limit the disclosure to particular forms, and the disclosure should be construed to cover all modifications, equivalents, and/or alternatives falling within the spirit and scope of the embodiments of the disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the disclosure may modify various components regardless of the order and/or the importance but does not limit the corresponding components. The above-described expressions may be used to distinguish an element from another element. For example, a first user device and a second user device indicate different user devices although both of them are user devices. For example, a first element may be termed a second element, and similarly, a second element may be termed a first element without departing from the scope of the disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there is no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical terms and scientific terms, may have the same meaning as commonly understood by a person of ordinary skill in the art to which the disclosure pertains. Terms, such as those defined in commonly used dictionaries, should be interpreted as having a meaning that is the same or similar to their meaning in the context of the relevant art and will not be interpreted in an idealized or overly formal sense unless expressly so defined herein. In some cases, eve the terms defined herein may not be construed to exclude embodiments of the disclosure.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation.

According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
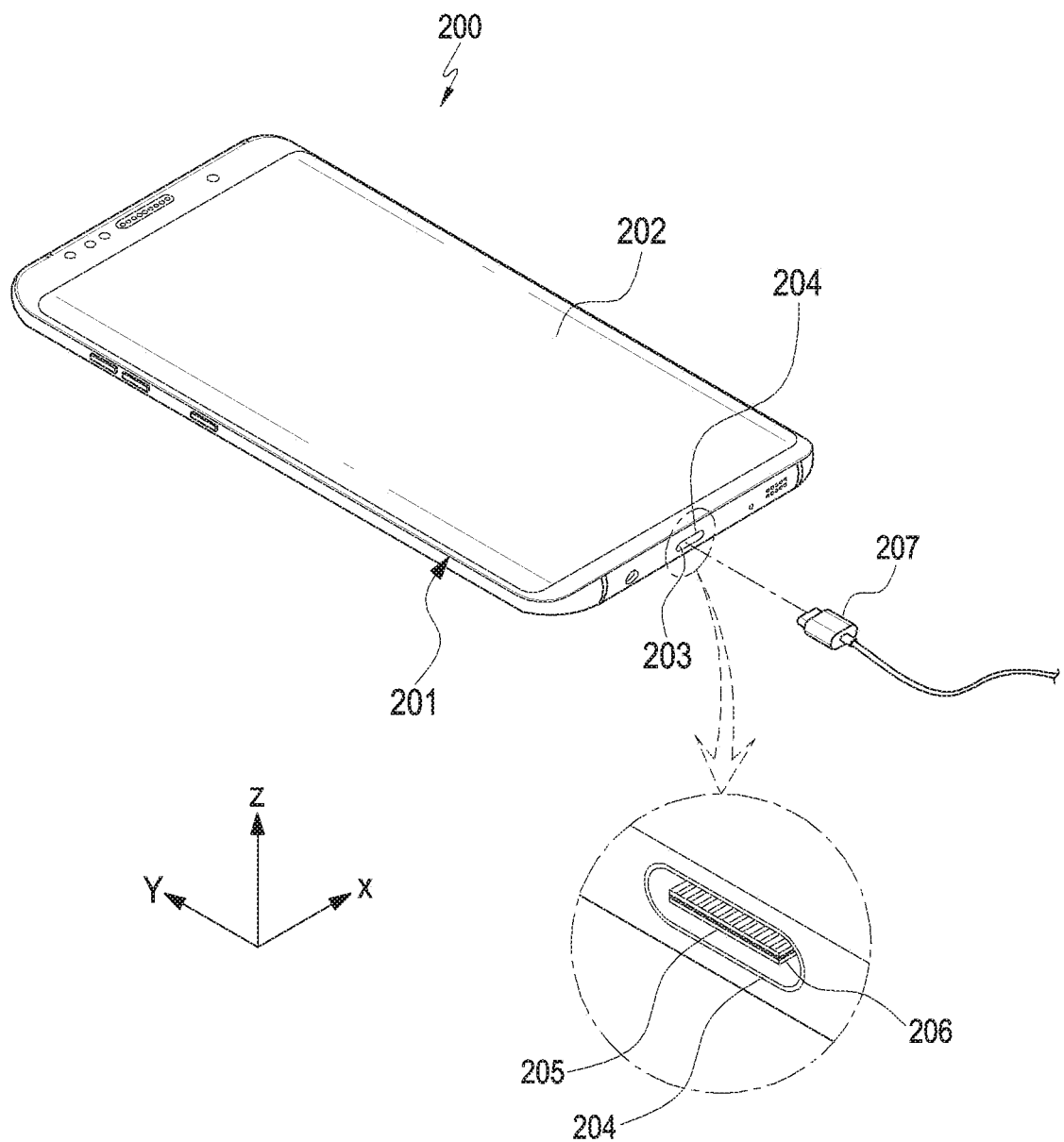
FIG. 2 is a perspective view of an electronic device according to various embodiments of the disclosure.

FIG. 2 is a perspective view of an electronic device according to various embodiments of the disclosure.

Referring to FIG. 2, "X" in a 3-axis orthogonal coordinate system may be the width direction of an electronic device 200 (for example, the electronic device 101 or the electronic device 102 of FIG. 1), "Y" may be the length direction of the electronic device 200, and "Z" may be the thickness direction of the electronic device 200.

The electronic device 200 may include a housing 201. According to an embodiment, the housing 201 may be formed on a conductive member and/or a nonconductive member. According to an embodiment, the electronic device 200 may include a touch-screen display 202 (for example, the display device 160 of FIG. 1), disposed so as to be exposed to at least some areas of the housing 201. According to an embodiment, the touch-screen display 202 may include a pressure sensor so as to be capable of operating as a pressure-responsive touch-screen display.

According to various embodiments, the electronic device may include a connector 203 (for example, the connecting terminal 178 of FIG. 1) for making the connection to an external electronic device. According to an embodiment, the connector 203 may be a socket-type connector.

According to various embodiments, an opening 204 for exposing the connector 203 may be formed in at least some areas of the housing 201, and the connector 203 may be disposed within the opening 204. According to various embodiments, a header-type external connector 207 may be connected forwards or backwards to the connector 203. That is, the external connector 207 may be inserted into the connector 203 in any direction regardless of the orientation thereof. According to an embodiment, the external connector 207 may be connected to an external electronic device, and the electronic device 200 and the external electronic device may be connected to each other as the connector 203 and the external connector 207 are connected to each other. According to various embodiments, the external electronic device may be various external electronic devices capable of being connected to the electronic device 200. For example, the external device may include a television (TV), an audio device, a notebook, a computer, a charging device, a memory, a fan, or an antenna (for example, a digital multimedia broadcasting antenna or an FM antenna).

According to an embodiment, the connector 203 may be used as an interface for connecting the electronic device 200 to an external electronic device or a power source (not shown). The electronic device 200 may transmit data of the electronic device 200 to the external electronic device or receive data from the external electronic device through the external connector 207 connected to the connector 203. Further, the electronic device 200 may receive power from a power source through the connector 203 or charge a battery using the power source. According to an embodiment, the connector 203 may be a Universal Serial Bus (USB) type C connector in which a contact substrate 205 may be formed. Further, a mid-plate 206 having an electrically conductive characteristic may be formed within the contact substrate 205, and a plurality of pins may be formed on the upper surface and the lower surface of the contact substrate 205.

According to an embodiment, a plurality of electronic devices 200 may operate while being mutually connected to each other through wireless or wired communication. For example, a smartphone may be connected to a wearable device such as a Head-Mounted Display (HMD) and provide content.

Figure 3A:
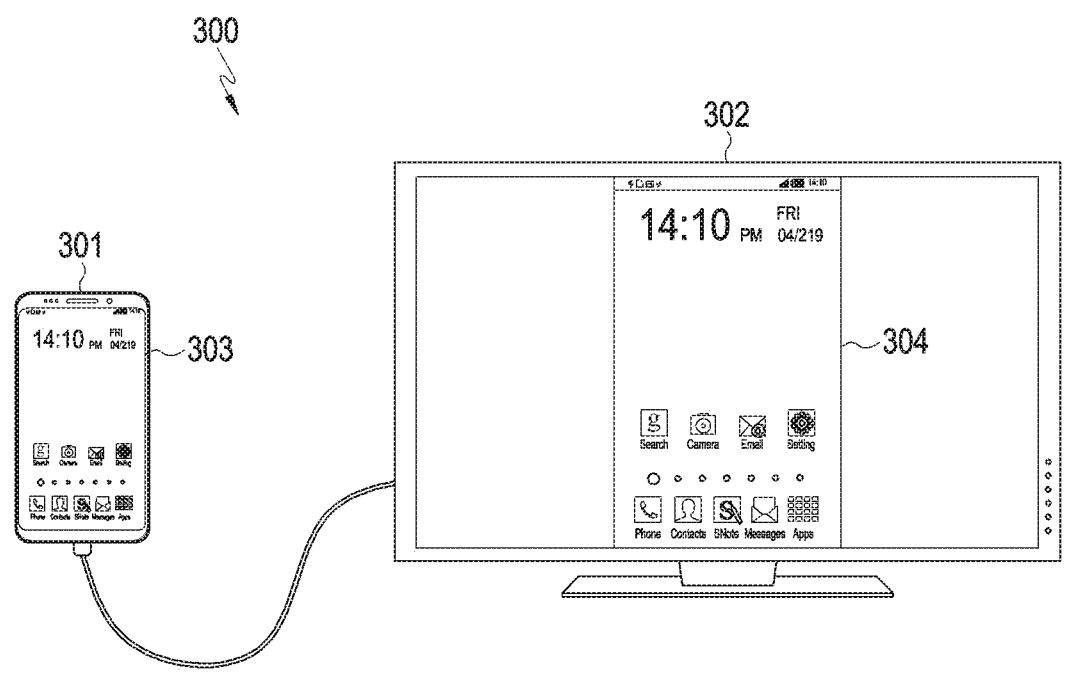
FIG. 3A illustrates a connection between an electronic device and an external electronic device according to an embodiment of the disclosure.

FIG. 3A is a diagram illustrating a connection between an electronic device and an external electronic device (for example, a TV) according to an embodiment of the disclosure.

Referring to FIG. 3A, in a diagram 300, when an electronic device 301 (for example, the electronic device 200 of FIG. 2) and an external electronic device 302 (for example, the electronic device 102 of FIG. 1) are connected to each other through a connector (for example, a USB), the electronic device 301 may function as a host (or a master) and the external electronic device 302 may function as a client (or a slave).

According to an embodiment, the external electronic device 302 may include a TV having a USB type C connector or a touch screen. When the external electronic device 302 is connected to the electronic device 301 performing a host (or master) function through the USB type C connector, the external electronic device 302 may perform a client (or slave) function.

When the external electronic device 302 is connected to the electronic device 301, power-related roles or data-related roles of the electronic device 301 and the external electronic device 302 may be determined on the basis of information recognized through the connector. For example, it may be determined whether to operate as a host device (or a Downstream-Facing Port (DFP)) or a client device (or an Upstream-Facing Port (UFP)) from the aspect of data transmission, and it may be determined whether to operate as a device (for example, a source device) for supporting power or a device (for example, a sink device) for receiving power from the aspect of power supply.

For example, in the state in which the electronic device 301 operates as the source device and as the host device and the external electronic device 302 operates as the sink device and as the client device, the data-related roles may be switched using a Power Delivery (PD) message (for example, a DR_SWAP message). In this case, the electronic device 301 may operate as the source device and the client device and the external electronic device 302 may operate as the sink device and the host device.

As described above, the electronic device 301 may be referred to as a host, a source, or a DFP, and the external electronic device 302 may be referred to as a client, a sink, or a UFP, and vice versa. For example, when it is assumed that the electronic device is a TV, a smartphone may be an example of the external electronic device connected to the electronic device. According to an embodiment, the external electronic device 302 may be an accessory device which can be accessed through the connector of the electronic device 301. The accessory device may include a Head-Mounted Display (HMD) or a docking station, and may be connected to an auxiliary accessory device, for example, a power supply device, and receive power.

According to various embodiments, the external electronic device 302 may be connected to the electronic device 301 and share data with the electronic device 301 through, for example, a screen-mirroring scheme. For example, the electronic device 301 may transmit a current screen 303 to the connected external electronic device 302, and the external electronic device 302 may scale (for example, enlarge) the received screen with a predetermined magnification and display a scaled screen 304. Further, content such as an image or a video stored in the memory of the electronic device 301 may be transmitted to the external electronic device 302, and thus the transmitted content may be displayed through a screen of the external electronic device 302.

Figure 3B:
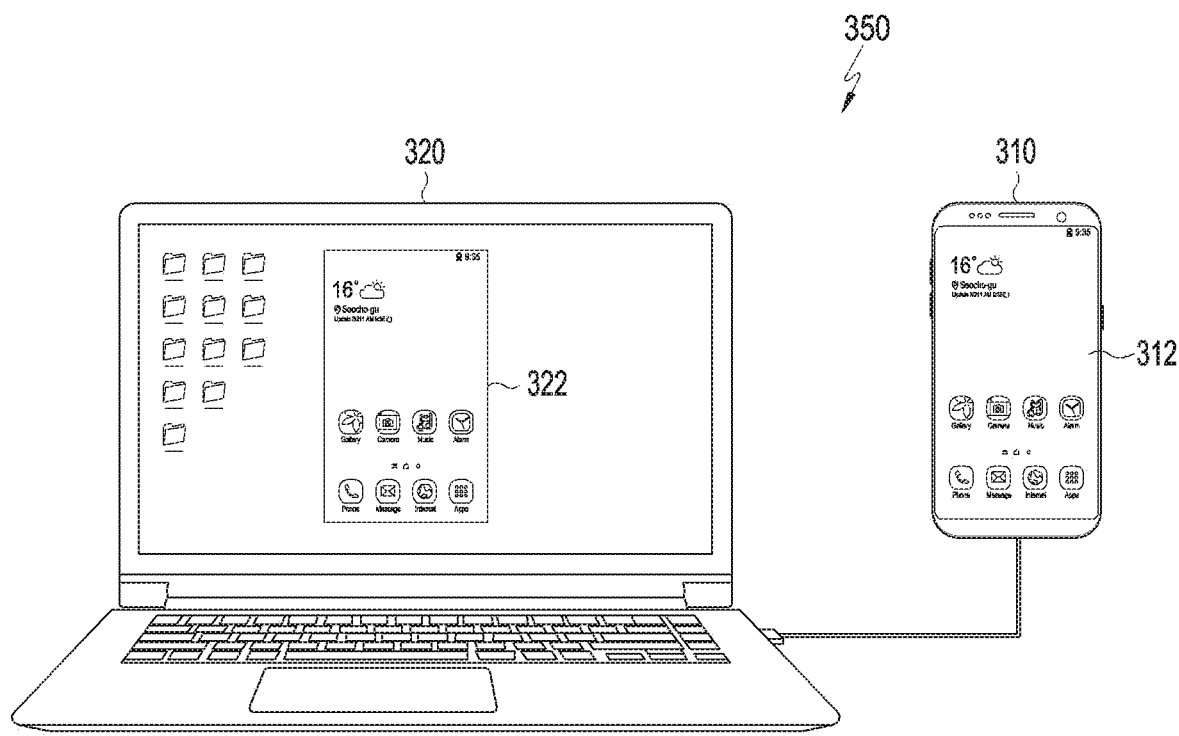
FIG. 3B illustrates a connection between an electronic device and an external electronic device according to an embodiment of the disclosure.

FIG. 3B is a diagram illustrating a connection between an electronic device (for example, a notebook) and an external electronic device (for example, a smartphone) according to an embodiment of the disclosure.

Referring to FIG. 3B, in a diagram 350, each of an electronic device 320 (for example, the external electronic device 302 of FIG. 3A) and an external electronic device 310 (for example, the electronic device 301 of FIG. 3A) according to an embodiment may support at least one of a host mode (or a host role) and a client mode (or a client role). For example, when a user controls (for example, updates, deletes, or downloads) data (for example, photos, videos, or documents) stored in the electronic device 320 using the external electronic device 310, the external electronic device 310 may play the host role and the electronic device 320 may play the client role. When the user controls data stored in the external electronic device 310 using the electronic device 320, the external electronic device 310 may play the client role and the electronic device 320 may play the host role.

For example, the external electronic device 310 may access the memory of the electronic device 320 to control data stored in the memory or display a screen 312 displayed on the external electronic device 310 on the electronic device 320, as indicated by reference numeral 322. In another example, the electronic device 320 may access the memory of the external electronic device 310 to control (for example, update, delete, or download) data stored in the memory or display a screen of the electronic device 320 in the external electronic device 310.

An embodiment of FIG. 3B may be used for a program (for example, Samsung SideSync) through which the electronic device 320 (for example, the notebook) mirrors the screen of the external electronic device 310 (for example, the smartphone). The program (for example, Samsung SideSync) may be a specialized service through which a desktop or a notebook can display and control a screen of a smartphone, and may provide a function of transferring the screen of the smartphone to the notebook and transferring keyboard and mouse input to the smartphone.

As described above, each of the electronic device 320 and the external electronic device 310 may support a role different from (opposite) the current role. The following embodiments will be described on the basis of an accessory device such as a TV or a notebook as an example of the electronic device 320 and a smartphone as an example of the external electronic device 310. However, the electronic device 320 or the external electronic device 310 is not limited to the accessory device or the smartphone. Further, hereinafter, an external electronic device such as a smartphone is referred to as the device playing the host role and an electronic device connected to the external electronic device through a connector is referred to as the device playing the client role, and vice versa. Accordingly, the external electronic device 310 may be referred to as a host, a source, or a DFP, and the electronic device 320 may be referred to as a client, a sink, or a UFP, and vice versa.

For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an Moving Picture Experts Group phase 1 or phase 2 (MPEG-1 or MPEG-2) audio layer 3 (MP3) player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

In some embodiments, the electronic device (or external electronic device) may be a smart home appliance. The smart home appliance may include at least one of, for example, a television, a Digital Video Disc (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Device, an electronic device for a ship (e.g., a navigation device for a ship and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, sports equipment, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the disclosure may be a combination of one or more of the aforementioned various devices. The electronic device according to some embodiments of the disclosure may be a flexible device. Further, the electronic device according to an embodiment of the disclosure is not limited to the aforementioned devices, and may include a new electronic device according to the development of technology FIG. 4 illustrates the detailed structure of a system according to various embodiments of the disclosure of the disclosure.

Figure 4:
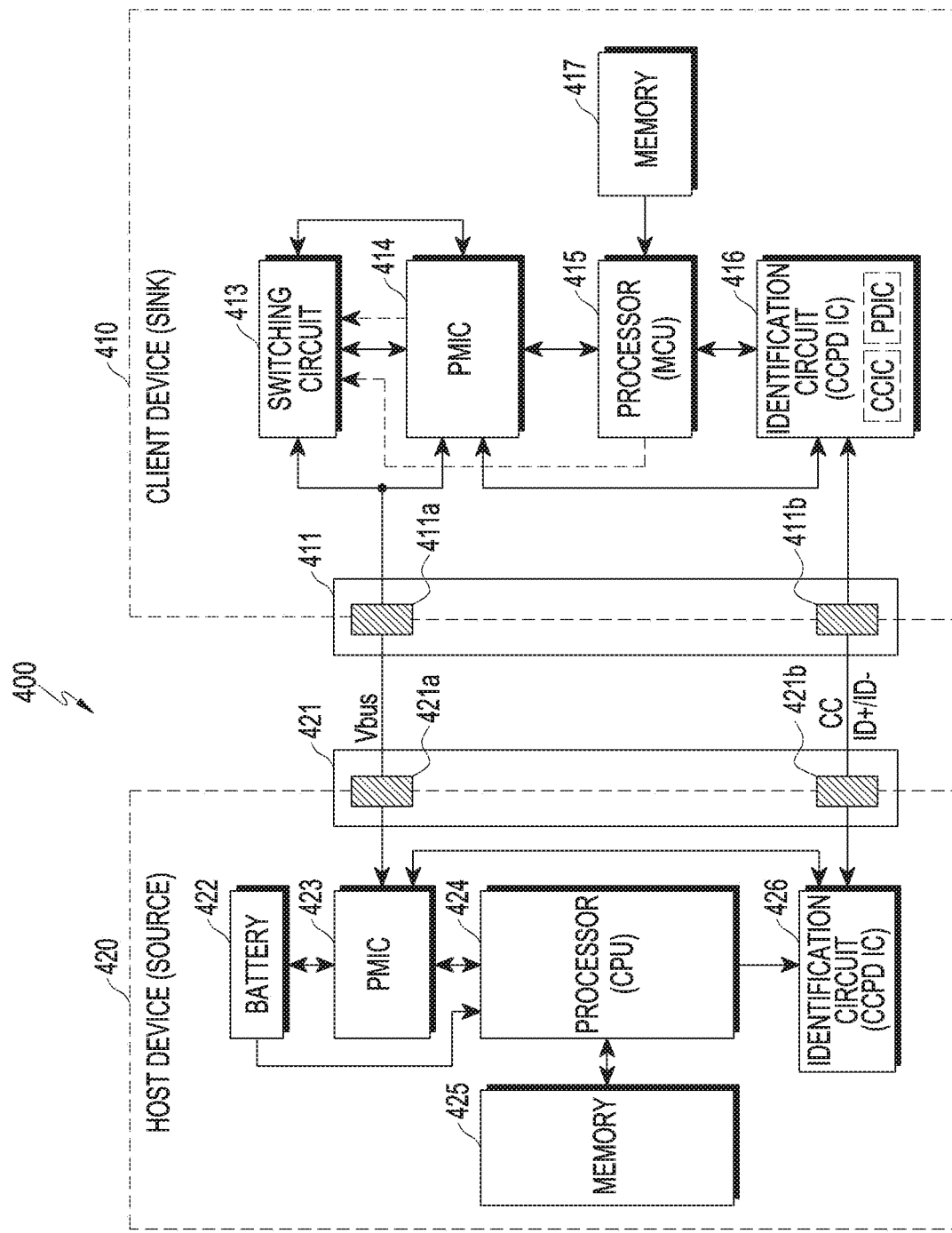
FIG. 4 illustrates a detailed structure of a system according to various embodiments of the disclosure.

Referring to FIG. 4, in a system 400, an external electronic device (a host device) (for example, a smartphone) 420 (for example, the electronic device 301 of FIG. 3A) according to various embodiments may operate while being linked to an electronic device (client device) (for example, a TV or an accessory device) 410 (for example, the external electronic device 302 of FIG. 3A).

The electronic device 410 may correspond to an accessory device functionally connected to the external electronic device 420. The electronic device 410 may correspond to, for example, the aforementioned TV or notebook. However, the electronic device 410 according to an embodiment of the disclosure is not limited thereto. Further, although the electronic device 410 is distinguished from, for example, the external electronic device 420, the electronic device 410 may be implemented along with the external electronic device 420 as a single device. For example, the external electronic device 420 may be located in at least a portion of the electronic device 410, or may be configured within the electronic device 410.

The electronic device 410 and the external electronic device 420 may be connected through a wired communication interface. According to various embodiments, the electronic device 410 and the external electronic device 420 may be connected through an image communication interface (for example, an HDMI interface, a DisplayPort interface, a Mobile High-definition Link (MHL) interface, or a USB audio video device interface). The electronic device 410 may be a source device that generates content (for example, image data) and the electronic device 410 may be a sink device that receives content and outputs or reproduces the content. The reverse is possible. According to various embodiments, the electronic device 410 and the external electronic device 420 may be connected through a USB communication interface. The external electronic device 420 may operate as a USB host, and the electronic device 410 may operate as a USB client. The reverse is possible.

The electronic device 410 and the external electronic device 420 may be connected through a connector. The connector may transfer analog or digital data to the inside or outside of the device. The connector may transfer power to the inside or outside of the device. According to various embodiments, the connector may be a USB type C connector. The electronic device 410 and the external electronic device 420 may transmit data and power to each other through a USB type C connector. According to various embodiments, when the electronic device 410 and the external electronic device 420 are connected via the USB type C connector, they may be connected to each other in an alternate mode. For example, an image signal of an image communication interface (for example, a DisplayPort interface of VESA) may be transmitted or received through the USB connector.

According to various embodiments of the disclosure, the type of the wired communication interface and the connector used by the electronic device 410 and the external electronic device 420 is not limited.

When the electronic device 410 is electrically connected to the external electronic device 420, the electronic device 410 may receive power from the external electronic device 420. For example, the electronic device 410 may receive power from the external electronic device 420 through a power port of the connector (for example, a V_BUS of the USB connector). The electronic device 410 may be driven using the power supplied from the external electronic device 420.

The electronic device 410 and the external electronic device 420 may transmit status information of each other through an ID terminal of the connector through communication and identify each other. According to an embodiment, the connector may include an ID terminal for supporting a "digital ID" scheme (for example, a CC terminal in the USB type C connector). According to various embodiments of the disclosure, the status information may be a data type that can be transmitted and received through a digital ID terminal included in the connector.

According to another embodiment, the connector may include an ID terminal for supporting a "resistive ID" scheme (for example, an ID terminal in a micro USB connector). According to various embodiments of the disclosure, the status information may be a data type transmitted in order to change a resistance value through a "resistive ID" terminal included in the connector.

The electronic device 410 and the external electronic device 420 may be connected through any of various communication interfaces. For example, the electronic device 410 may include a High-Definition Multimedia Interface (HDMI), an optical interface, a D-SUB interface, or a lightning terminal, and may be connected to the external electronic device 420 on the basis of at least one of the HDMI, the optical interface, the D-SUB interface, and the lightning terminal.

The electronic device 410 may include a processor 415 (for example, a Micro Controller Unit (MCU)), a power management Integrated Circuit (IC) 414, an identification circuit 416 (for example, a Coupling Capacitor Potential Devices (CCPD) IC), a connector 411, a switching circuit 413, and/or a memory 417.

The switching circuit 413 may include at least one element according to various embodiments, and may be a circuit for changing the transmission path of the current according to a specific control signal or a specific condition or short-circuiting or connecting the transmission of the current.

The power management circuit 414 may control the voltage of the power supplied to each element included in the electronic device 410. The power management circuit 414 may output a preset voltage (for example, 3.0V). For example, the power management circuit 414 may include a low drop-out voltage regulator (LDO).

The power management circuit 414 may receive power of the external electronic device 420 or a power supply device (not shown) and output the preset voltage (for example, 3.0V).

The processor 415 may be electrically connected to the connector 411, and may control the operation of the electronic device 410 and/or signal flow between blocks of the electronic device 410 and perform a data-processing function to process data. For example, the processor 415 may be a Central Processing Unit (CPU), an Application Processor (AP), a Micro Controller Unit (MCU), or a Micro Processor Unit (MPU). The processor 415 may be a single core processor or a multi-core processor.

The identification circuit 416 may transmit data received through a data communication terminal 411b of the connector 411 to the processor 415 and a message or information generated by the processor 415 to the external electronic device 420 through the data communication terminal 411b of the connector 411. The identification circuit 416 may include at least one of a Micro-USB Interface Controller (MUIC), a Cable and Connector Integrated Chip (CCIC), or a Power Delivery Integrated Chip (PDIC).

The memory 417 may be electrically connected to the processor 415 and may store an Operating System (OS) of the electronic device 410 and applications required for other option functions, for example, an audio reproduction function and an image or video reproduction function. The memory 417 may correspond to the memory 130 of FIG. 1.

The memory 417 may store various pieces of information and programs required to identify the type of the external electronic device according to an embodiment of the disclosure. For example, the program may include a routine for detecting the connection of the external electronic device 420 through the connector 411, a routine for identifying the type of the external electronic device 420 when the connection of the external electronic device 420 is made during a power negotiation step, and a routine for making settings corresponding to the identified external electronic device 420.

According to various embodiments of the disclosure, the memory 417 may store instructions causing the processor 415 to, when executed, identify the connection to the external electronic device through the connector 411, receive one or more pieces of information about power that can be supported by the external electronic device 420 from the external electronic device 420 when the connection to the external electronic device 420 is made through the connector 411, and identify the external electronic device on the basis of at least the one or more pieces of power information.

According to an embodiment, the instructions may be configured to cause the processor 415 to identify predetermined power information for identifying the external electronic device 420 operating as the host among the one or more pieces of power information and identify the type of the external electronic device 420 on the basis of the predetermined power information.

According to an embodiment, the one or more pieces of power information may be received using a Universal Serial Bus (USB) Power Delivery (PD) communication-based source capability message.

According to an embodiment, the source capability message may include at least one of a message header including a field related to the number of data objects, a field related to a message type, and one or more data-object-related fields, and predetermined power information for identifying the external electronic device may be configured in the one or more data-object-related fields.

According to an embodiment, the predetermined power information may include at least one of a predetermined current value and a predetermined voltage value for identifying the external electronic device 420.

According to an embodiment, the instructions may be configured to cause the processor 415 to select at least one piece of power information among the one or more pieces of power information that can be supported by the external electronic device 420 and transmit a power request message including the at least one piece of selected power information to the external electronic device 420.

According to an embodiment, the instructions may be configured to cause the processor 415 to receive a power supply preparation message from the external electronic device 420 after transmitting the power request message, perform power negotiation, based on the received power supply preparation message, and enter an alternate mode when the power negotiation is completed.

According to an embodiment, at least some operations of the processor 415 may be performed by a Configuration Channel (CC) Power Delivery (PD) IC.

The connector 411 may include a device to be functionally connected to the external electronic device 420. The connector 411 may include one or more signal terminals for communication with the external electronic device 420. According to an embodiment, the connector 411 may include a power supply terminal 411a for supplying or receiving power, a data communication terminal 411b for data communication with the external electronic device 420, and/or a ground terminal (not shown). The arrangement of the power supply terminal 411a and the data communication terminal 411b is not limited to what is shown in FIG. 4, and may vary depending on the characteristics of the electronic device 410. The power supply terminal 411a may be embodied as a first pin and the data communication terminal 411b may be embodied as a second pin. According to various embodiments of the disclosure, the connector may comply with the USB connector standard. In this case, the power supply terminal 411a may correspond to a VBUS terminal of the USB connector and the data communication terminal 411b may correspond to D+ and D− terminals of the USB connector or Tx and Rx terminals of the USB connector.

The power supply terminal 411a may receive power transmitted from the external electronic device 420 and transmit power transmitted from a power supply device (not shown) to the external electronic device 420.

The data communication terminal 411b may include, for example, D+ and D− terminals and/or Tx+/− and Rx+/− terminals. Various names for the terminal may be used depending on the type of connector. The electronic device 410 may transmit and receive information to and from the external electronic device 420 through the data communication terminal 411b.

According to an embodiment, the connectors 411 and 421 of the electronic device 410 and the external electronic device 420 may be USB type C connectors. The electronic device 410 and the external electronic device 420 may be connected to each other through their own connectors 411 and 421, and it may be determined that the electronic device 410 and the external electronic device 420 are in different operation states. According to the specifications of USB type C, internal communication may be established using configuration pins CC1 and CC2 within the connector, and it may be determined whether the electronic device operates as the host or the client depending on Rp (Pull-Up resistance) and Rd (Pull-Down resistance) to which pins CC1 and CC2 are connected.

According to various embodiments of the disclosure, when the external electronic device 420 operates as the host and the electronic device 410 operates as the device, the electronic device 410 may identify the type of the external electronic device 420 on the basis of a message received through the CC pin of the connector 411 in order to identify the type of the initially connected external electronic device 420. Accordingly, since the electronic device 410 is not required to perform an operation of switching the roles of the host and the device in order to identify the type of the external electronic device 420, the step for identifying the device may be simplified and thus the communication time may be reduced.

Meanwhile, although not illustrated in FIG. 4, the electronic device 410 according to an embodiment of the disclosure may further selectively include elements including an input module such as a touch pad, a button key, or a touch key, a digital sound source reproduction module, various sensor modules such as an infrared sensor module and an illumination sensor module, and/or a display module. Further, the electronic device 410 according to the embodiment of the disclosure may further include elements at the same level as the aforementioned elements.

The external electronic device 420 may include a processor 424 (for example, a Central Processing Unit (CPU) or an Application Processor (AP)), a power management circuit 423, a battery 422, a connector 421, an identification circuit 426, and/or a memory 425.

The connector 421 may include a device that is functionally connected to the electronic device 410. The connector 421 may include one or more signal terminals for communication with the electronic device 410. The connector 421 may include a power supply terminal 421a for supplying or receiving power, a data communication terminal 421b for data communication with the electronic device 410, and/or a ground terminal (not shown). In this specification, the power supply terminal 421a may be embodied as a first pin and the data communication terminal 421b may be embodied as a second pin.

According to various embodiments of the disclosure, the connector may comply with the USB connector standard. In this case, the power supply terminal 421a may correspond to a VBUS terminal of the USB connector, and the data communication terminal 421b may correspond to D+ and D− or Tx and Rx terminals.

The battery 422 may supply power to each element included in the external electronic device 420. The battery 422 may be, for example, a chargeable secondary cell. The battery 422 may be, for example, a battery electrically connected to the external electronic device 420, an internal battery embedded into the external electronic device 420, or a removable battery that can be removed by the user.

The power management circuit 423 may manage the power supplied to the external electronic device 420. The power management circuit 423 may include a Power Management Integrated Circuit (PMIC) (not shown), a voltage regulator (not shown), a power input/output unit, and a charger Integrated Circuit (IC) (not shown). Further, through a combination of various ICs, circuits, and software, a role to control power and regulate a voltage may be included.

The processor 424 of the external electronic device 420 may control the general operation of the external electronic device 420 and the signal flow between internal blocks of the external electronic device 420 and perform a data-processing function in order to process data. For example, the processor 424 of the external electronic device 420 may be a Central Processing Unit (CPU) or an Application Processor (AP). The processor 424 of the external electronic device 420 may be a single-core processor or a multi-core processor. Alternatively, the processor 424 of the external electronic device 420 may include a plurality of processors.

The processor 424 of the external electronic device 420 may be electrically connected to the connector 421, and may receive a notification indicating whether the electronic device 410 is connected through the connector 421. The processor 424 of the external electronic device 420 may perform a power negotiation step with the electronic device 410 on the basis of the notification. In the power negotiation step, if the external electronic device 420 informs the electronic device 410 of supportable power information, the electronic device 410 may select one piece of power information from among the supportable power information and inform the external electronic device 420 of the selected power information, so that settings based on optimized power information may be made therebetween.

According to various embodiments of the disclosure, in initial connection during the power negotiation step, the external electronic device 420 may carry additional information used for identifying the external electronic device 420 in a power information message transmitted to the electronic device 410. According to an embodiment, the power information message may be a source capability message based on Universal Serial Bus (USB) Power Delivery (PD) communication.

In the initial connection during the power negotiation step, the processor 424 of the external electronic device 420 may generate a power information message including one or more pieces of power information (for example, a current value and voltage value) that can be supported by the external electronic device 420 and predetermined additional information for identifying the external electronic device. According to an embodiment, the predetermined additional information may have a form similar to that of the power information, may accordingly include at least one of the current value and the voltage value, and may have a predetermined value corresponding to the type of the external electronic device in order to identify the type thereof.

The processor 424 of the external electronic device 420 may receive a power request message including at least one piece of power information selected from among supportable power information from the electronic device 410 in response to transmission of the power information and transmit a power supply preparation message to complete the power negotiation step.

The identification circuit 426 may be connected to an ID terminal 421b of the connector 421, may determine which electronic device is connected to the connector 421, and may transmit information on the electronic device (for example, the electronic device 410) to the processor 424 of the external electronic device 420. The identification circuit 426 may be implemented in the form of a chip independently from the processor 424 of the external electronic device 420 and may be included in a portion of the processor 424 of the external electronic device 420, as illustrated.

For example, in the case of the USB type C connector, the ID terminal 421b may correspond to the CC terminal and the identification circuit 426 may correspond to a Configuration Channel Integrated Circuit (CCIC). In the USB connector, the number of CC terminals may be two. For example, the CCIC (corresponding to reference numeral 426 in the drawing) may determine the directivity of a cable connected to the connector 421. One CC terminal may be used to transmit power to a cable (or an external electronic device), and the remaining one CC terminal may be used to determine which device is connected to the connector 421 through communication with a counterpart device connected through the cable and manage the connection.

According to various embodiments of the disclosure, the identification circuit 426 may be omitted. For example, according to various embodiments, the external electronic device 420 may not include the identification circuit 426. The external electronic device 420 may operate in a charging mode, an On-The-Go (OTG) mode, or a power-path mode according to the control of the processor 424 of the external electronic device 420.

The memory 425 may be electrically connected to the processor 424 and may store an Operating System (OS) of the external electronic device 420 and applications required for other option functions, for example, an audio reproduction function and an image or video reproduction function. The memory 425 may correspond to the memory 130 of FIG. 1.

According to various embodiments of the disclosure, the memory 425 may store instructions causing the processor 424 to, when executed, identify a connection to the electronic device 410 through the connector 421, transmit one or more pieces of power information including predetermined power information for identifying the external electronic device 420 to the electronic device 410 in the connection to the electronic device 410 through the connector 421, transmit a power supply preparation message when a power request message including selected power information is received from the electronic device 410, and perform a power negotiation step, based on the power request message.

According to an embodiment, the one or more pieces of power information may be transmitted using a USB Power Delivery (USB-PD) communication-based source capability message, the source capability message may include at least one of a message header, including a field related to the number of data objects, a field related to a message type, and one or more data-object-related fields, and predetermined power information for identifying the external electronic device may be configured in the one or more data-object-related fields.

According to an embodiment, at least some functions of the processor 424 may be performed by the identification circuit 426. Further, the processor 424 may be implemented so as to perform at least some of the functions of the identification circuit 426.

Figure 5A:
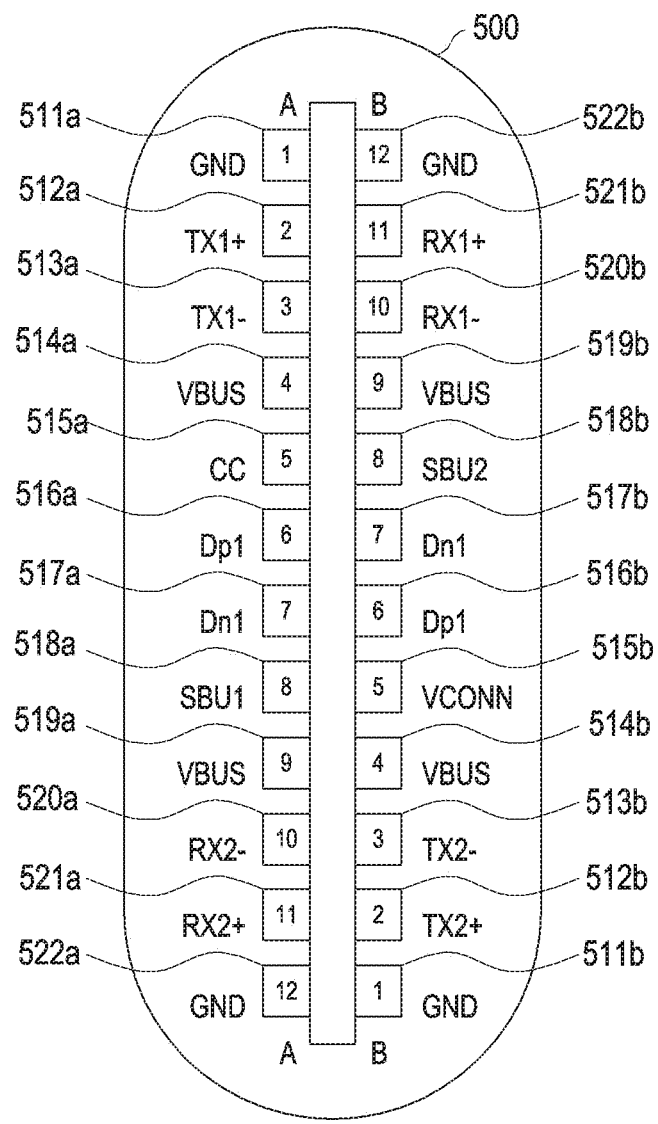
FIG. 5A illustrates pins of a connector according to various embodiments of the disclosure.

FIG. 5A illustrates pins of a connector according to various embodiments of the disclosure.

Referring to FIG. 5A, a connector 500 (for example, the connecting terminal 178 of FIG. 1 or the connector 203 of FIG. 2) according to various embodiments may be a USB type C connector. The connector 500 may include a plurality of pins. According to various embodiments, the connector 500 may include a plurality of first pins on a first surface (for example, surface A) corresponding to a forward direction and a plurality of second pins on a second surface (for example, surface B) corresponding to a backward direction. For example, the plurality of first pins may include a GND pin 511a, a TX1+ pin 512a, a TX1− pin 513a, a VBUS pin 514a, a CC pin 515a, a Dp1 pin 516a, a Dn1 pin 517a, an SBU1 pin 518a, a VBUS pin 519a, an RX2− pin 520a, an RX2+ pin 521a, and a GND pin 522a. For example, the plurality of second pins may include a GND pin 511b, a TX2+ pin 512b, a TX2− pin 513b, a VBUS pin 514b, a VCONN pin 515b, a Dp1 pin 516b, a Dn1 pin 517b, an SBU1 pin 518b, a VBUS pin 519b, an RX1− pin 520b, an RX1+ pin 521b, and a GND pin 522b.

The electronic device (for example, the electronic device 410) may be electrically connected to an external electronic device (for example, the external electronic device 420) through a connector 500. The connector 500 of the electronic device may have a form such that the connector of the external electronic device can be put thereto in either direction of the forward and backward directions. For example, the arrangement sequence of twelve pins formed on the first surface (for example, surface A) may be the same as the arrangement sequence of twelve pins formed on the second surface (for example, surface B) so that the connector of the external electronic device can be inserted in either of two directions respectively corresponding to the first surface and the second surface. Due to this structure, the user may put the connector of the external electronic device into the connector 500 of the electronic device in a rotated state at 180 degrees.

FIG. 5B illustrates pins of a connector according to various embodiments of the disclosure.

According to an embodiment, the arrangement of the pins formed on the first surface (for example, surface A) and the second surface (for example, surface B) of the contact substrate formed within the connector 500 may be as shown in FIG. 5B.

Referring to FIG. 5B, the TX1+ pin and the TX2+ pin 512a and 512b and the TX1− pin and the TX2− pin 513a and 513b may be pins for super speed TX for rapid transmission of data, the VBUS pins 514a and 514b may be pins for USB-cable charging power, the CC pin 515*a* may be a pin serving as an identification terminal, the VCONN pin 515*b* may be a pin for supporting plug power, the Dp1 pins 516*a* and 516*b* and the Dn1 pins 517*a* and 517*b* may be pins for USB signals in two different directions, the SBU1 pin and the SBU2 pin 518*a* and 518*b* may be extra pins that can be used for various signals (for example, an audio signal and a display signal), and the RX2− pin and the RX1− pin 520*a* and 520*b* and the RX2+ pin and the RX1+ pin 521*a* and 521*b* may be pins for super speed RX for rapid reception of data.

The electronic device and/or the external electronic device connected through the USB type C connector determine whether to operate in a host mode or a client mode through communication using a CC pin. According to an embodiment, the electronic device and/or the external electronic device may determine the host mode or the client mode through Rp/Rd resistance connected to the CC pin.

Figure 6:
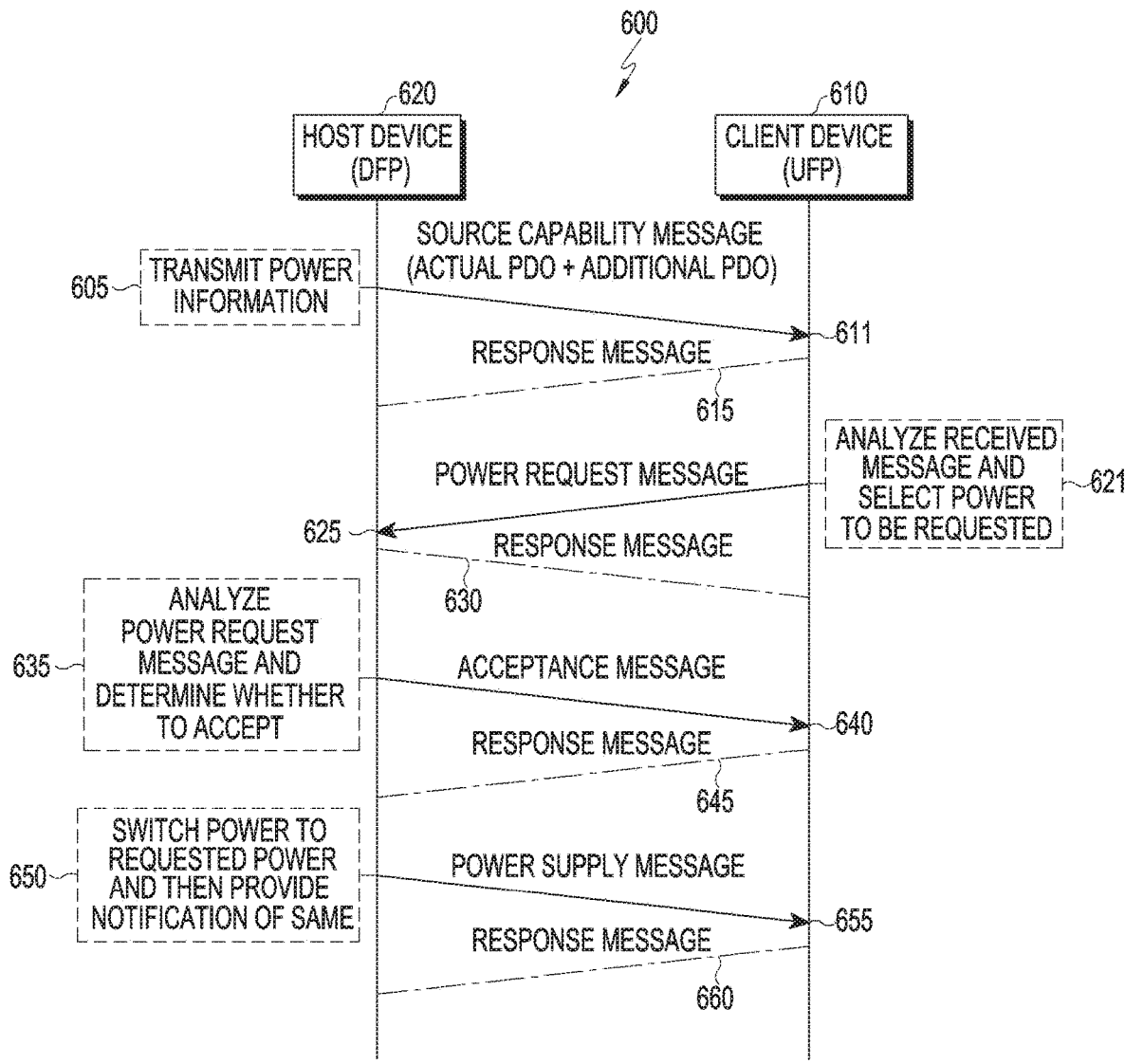
FIG. 6 is a flowchart for message transmission/reception for identifying a type of an external electronic device by an electronic device according to various embodiments of the disclosure.

FIG. 6 is a flowchart for message transmission and reception in which the electronic device (client device) identifies the type of the external electronic device (host device) according to various embodiments of the disclosure. Each operation in the flowchart for message transmission and reception may be performed by at least one of a host device (or a Downstream-Facing Port (DFP)), a client device (or an Upstream-Facing Port (UFP)), an electronic device (for example, the electronic device 101 or 102 of FIG. 1), the external electronic device 420 of FIG. 4, and the electronic device 410.

Referring to FIG. 6, in a method 600, an electronic device (i.e., client device 610) may be determined to operate as the host or the client using the resistance applied to the pin of the connector, for example, Rp (Pull-Up resistance) or Rd (Pull-Down resistance) to which the pins CC1 and CC2 of the connector are connected depending on the characteristics of the external electronic device. For example, when the external electronic device is the host device 620, such as a smartphone, the client device 610 may operate as the client device.

When it is determined that the external electronic device operates as the host device 620 and the electronic devices operates as the client device 610 in initial connection through the connector, the host device 620 may transmit power information of the host device 620 in operation 605. The power information may be transmitted through a source capability message in operation 611. A message about power information transmitted from the host device 620 may be a PD message about power supply according to a method specified in the USB type C standard, for example, a source capability message transmitted by the host device 620 in the power negotiation step.

The source capability message includes power information that can be supported by the host device 620, for example, information on which voltage and current can be supplied by the host device 620.

According to various embodiments of the disclosure, the source capability message may include not only one or more pieces of power information that can be supported by the host device 620 but also additional information used for identifying the type of the host device 620. According to an embodiment, the source capability message may include an area (or a field) in which one or more pieces of supportable power information are configured, for example, a first Power Data Object (PDO) field and an area (or a field) in which the additional information is configured, for example, a second PDO field. The PDO may correspond to data containing information on power (for example, voltage and current) that can be supplied by the host device 620. The PDO may be used to carry capabilities of a source device for providing power.

According to an embodiment, when the number of pieces of power information that can be supported by the host device 620 is plural, the source capability message may include a plurality of PDO fields, for example, a maximum of 8 fields. According to an embodiment, in the source capability message, the second PDO field in which the additional information for identifying the type of the host device 620 is configured may be added to the first PDO field in which the supportable power information is configured. At this time, the number of each of the first PDO field and the second PDO field may be a maximum of 8. Further, the additional information for identification may not only be configured using one PDO field but may also be configured using two or more PDO fields.

As described above, according to an embodiment, the additional information for identification may be configured in at least one area among the areas in which the one or more pieces of power information that can be supported by the host device 620 are configured within the source capability message. According to an embodiment, the additional information for identification may include predetermined current and voltage values for identifying the host device 620. For example, the additional information for identification may be configured in the same type as the power information including the current and voltage values. The format of the source capability message will be described below with reference to FIGS. 7A and 7B.

Meanwhile, the client device 610 may receive the source capability message from the host device 620 and may transmit a response message thereto (for example, "GoodCRC" message) in operation 615. In operation 621, the client device 610 may analyze the received message and select the power to be requested.

According to an embodiment, the client device 610 may identify predetermined additional information for identifying the type of the external electronic device, that is, the host device 620 operating as the host, among information included in the received source capability message and identify the type of the host device 620 on the basis of the predetermined additional information.

Further, the client device 610 may select power information to be used by the client device 610 among supportable power information included in the source capability message.

As described above, according to various embodiments of the disclosure, the client device 610 may identify the voltage and the current that can be supplied by the host device 620 by identifying a plurality of PDO fields included in the source capability message. For example, in the supportable power information, the voltage can be configured in units of 50 Mv and the current can be configured in units of 10 mA, but the voltage may generally use an integer value such as 5V, 9V, 12V, or 20V. Further, in the supportable power information, the current may mainly use a value having the unit of about 500 mA such as 1 A or 1.5 A.

Meanwhile, according to various embodiments of the disclosure, the additional information for identification may be added in the form of a PDO including at least one of a predetermined voltage value and a current value in the source capability message. According to an embodiment, the predetermined voltage value and current value may be a voltage value and a current value that are not generally used, for example, values other than generally used integer values.

For example, when a PDO having a voltage value of 5.05V (5050 mV) and a current value of 0.01 A (10 mA) is defined as device "D", if the client device 610 identifies that there is a PDO having a voltage value of 5.05V (5050 mV) and a current value of 0.01 A (10 mA) in a PDO list within the source capability message received from the host device 620, the client device 610 may determine that the type of the host device 620 is device "D". As described above, according to various embodiments of the disclosure, the voltage value and the current value used for identifying the host device 620 are predetermined values, which may be configured as a voltage value using values even below a decimal point or a current value that is too small to actually be used. Accordingly, since the client device 610 selects a voltage value and a current value that are rarely used, there is no request for the selected voltage value and current value, and thus the selection of incorrect power information can be prevented in advance.

According to an embodiment, the additional information used for identifying the type of the host device 620 may be configured using one PDO but configured through a combination of two or more PDOs. For example, when the number of pieces of power information that can be supported by the host device 620 is 4, 4 PDOs can be used, and a maximum of 8 PDOs can be carried on the source capability message, so that a combination of two or more PDOs among the remaining 4 PDOs is possible.

In operation 625, the client device 610 may transmit a power request message (for example, "Request" message) including selected power to the host device 620 and receive a response message thereto (for example, a "GoodCRC" message) in operation 630. The "Request" message according to the USB PD standard is one of data message types of the PD message that may be transmitted by a sink device requesting power during a power negotiation request interval.

The host device 620 may analyze the power request message and determine whether to accept the provision of selected power in operation 635. Accordingly, the host device 620 may transmit an acceptance message (for example, an "Accept" message) to the client device 610 in operation 640 and receive a response message thereto (for example, a "GoodCRC" message) in operation 645. The "Accept" message is one of control message types of the PD message according to the USB PD standard, which may be transmitted by a reception side that receives a specific message, such as the "Request" message, during the power negotiation.

Subsequently, the host device 620 may switch to requested power in operation 650, transmit a power supply message (for example, "PS_Ready" message) indicating that power supply is prepared to the client device 610 in order to inform the client device 610 of the power switching in operation 655, and then receive a response message thereto (for example, a "GoodCRC" message) in operation 660, which completes the power negotiation step between the host device 620 and the client device 610. The "PS_Ready" message is one of control message types of the PD message according to the USB PD standard, which may be transmitted by a source device in order to indicate that power supply has reached a desired operation state. As described above, when the power negotiation step is completed, the client device 610 may enter a specific mode (for example, an alternate mode). Accordingly, the user who views a display screen of the host device 620 through the client device 610 such as a TV can perform control to transmit user input for controlling a screen displayed on the client device 610 to the host device 620.

As described above, according to various embodiments of the disclosure, it is possible to identify the host device by simply adding the PDO for additional information for identification into the PD message, for example, the source capability message indicating power information, without any change in the USB PD communication scheme. Further, according to various embodiments of the disclosure, it is possible to identify which device is the host device without using a message for swapping roles ("DR swap" message) and a separate message for identifying a device ("Device Identify (DI)" message). Accordingly, device identification is possible without the step of exchanging the "DR swap" message and the step of transmitting the DI message after the power negotiation step, and thus the step may be simplified and the communication time may be reduced.

Figure 7A:
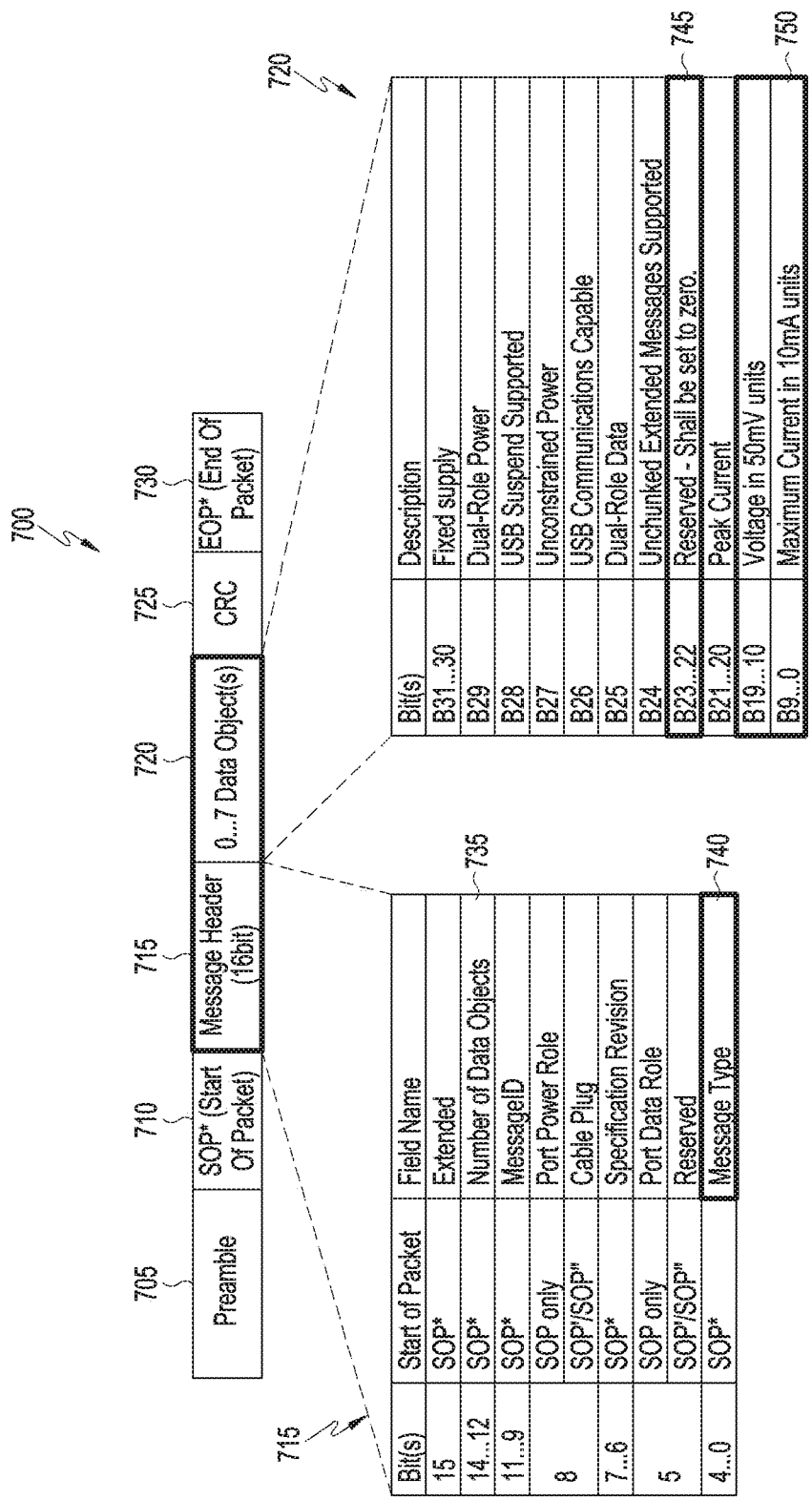
FIG. 7A illustrates a Power Delivery (PD) message format according to various embodiments of the disclosure.

FIG. 7A illustrates a PD message format according to various embodiments of the disclosure.

Figure 7B:
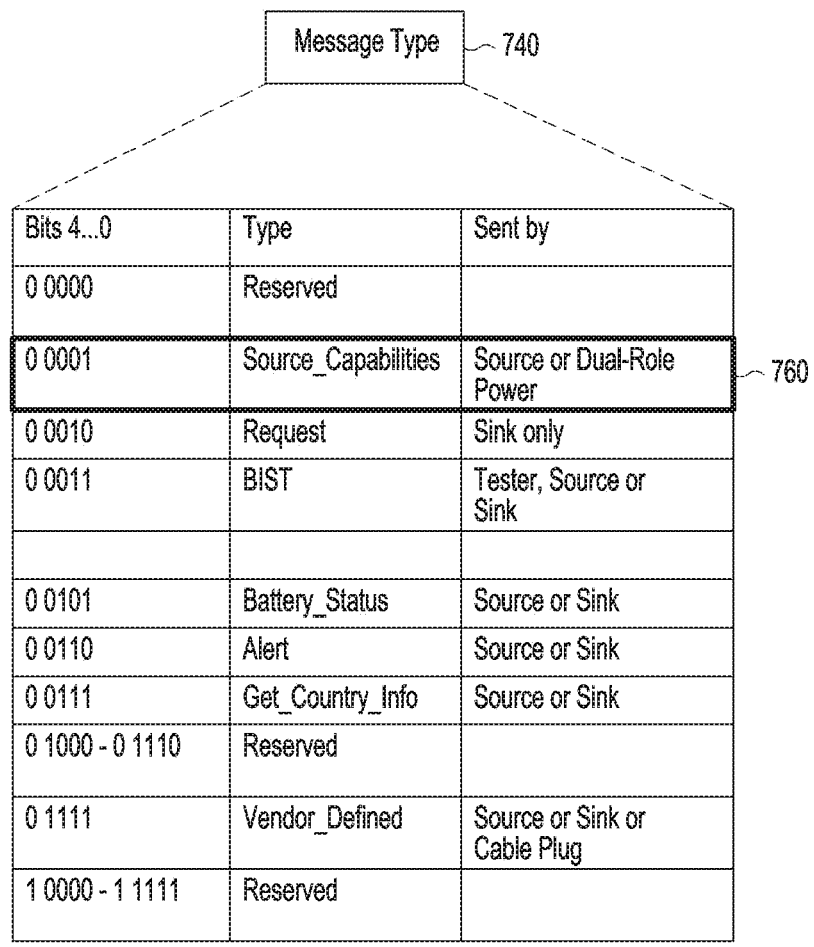
FIG. 7B illustrates a PD message format according to various embodiments of the disclosure.

FIG. 7B illustrates a PD message format according to various embodiments of the disclosure.

Referring to FIG. 7A, a PD message 700 may have a packet form, and may largely include a preamble 705, a Start of Packet (SOP) 710 indicating the start of the packet, a message header 715, one or more data objects 720, a Cyclic Redundancy Check (CRC) 725 for identifying an error of transmitted data in data transmission, and an End of Packet (EOP) 730 indicating the end of the packet.

The message header 715 may include a field 735 related to the number of data objects actually carried in the packet and a field 740 related to a message type.

The format of the field 740 related to the message type is as shown in FIG. 7B. Information configured the field 740 related to the message type may vary depending on a control message type or a data message type, wherein the message type may correspond to, for example, "GoodCRC", "Accept", and "PS_Ready" and the data message type may correspond to, for example, "Source_Capabilities" and "Request".

According to an embodiment of the disclosure, in order to indicate that the PD message is a message used to carry one or more pieces of power information, a bit value may be configured in the field 740 related to the message type. For example, referring to FIG. 7B, a bit value of "00001" 760 may indicate that the message type is a source capability message such as "Source_Capabilities" and that a counterpart device transmitting the source capability message is a source device or a dual-mode device. As described above, the field 740 related to the message type may be defined as a source capability message transmitted by a device that may operate in a source mode or a device that may operate in a dual mode supporting both a source operation mode and a sink operation mode.

A maximum of 8 pieces of power information may be carried in the one or more data-object-related fields 720, and the amount of power information may correspond to the number of voltages that can be supplied by the host device 620. According to an embodiment, the voltage fixed to 5V may be necessarily provided according to the USB PD standard, and in the case of a charger, three or four pieces of power information may be carried in the one or more data-object-related fields 720. According to an embodiment of the disclosure, predetermined power information for identifying the external electronic device (for example, the host device 620) may be configured in at least one of the data-object-related fields 720. According to an embodiment, at least one of "Reserved" 745 or "Voltage in 50 mV units" and "Maximum Current in 10 mA units" 750 of the data-object-related fields 720 may be used for predetermined power information. For example, at least one of a predetermined current value or a predetermined voltage value for identifying the external electronic device may be configured as at least one of "Reserved" 745 or "Voltage in 50 mV units" and "Maximum Current in 10 mA units" 750. For a more detailed description, reference is to be made to FIGS. 8A to 8F.

FIG. 8A illustrates one or more pieces of power information carried on a PD message according to various embodiments of the disclosure.

Figure 8B:
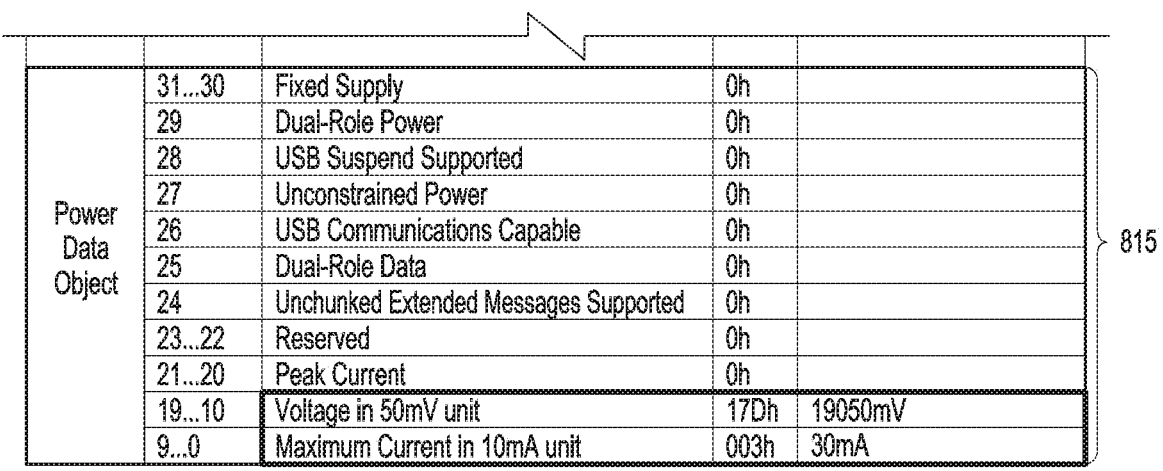
FIG. 8B illustrates one or more pieces of power information carried on a PD message according to various embodiments of the disclosure.

FIG. 8B illustrates one or more pieces of power information carried on a PD message according to various embodiments of the disclosure.

Figure 8C:
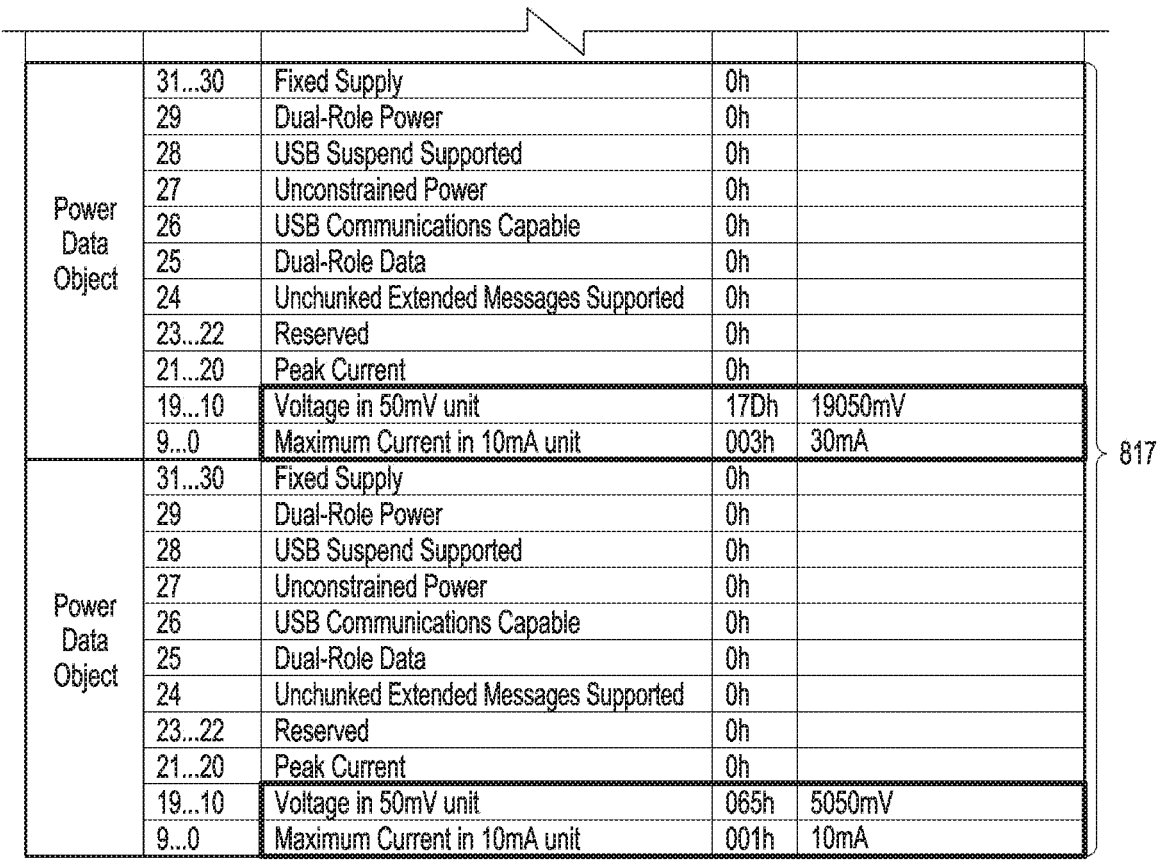
FIG. 8C illustrates one or more pieces of power information carried on a PD message according to various embodiments of the disclosure.

FIG. 8C illustrates one or more pieces of power information carried on a PD message according to various embodiments of the disclosure.

Figure 8D:
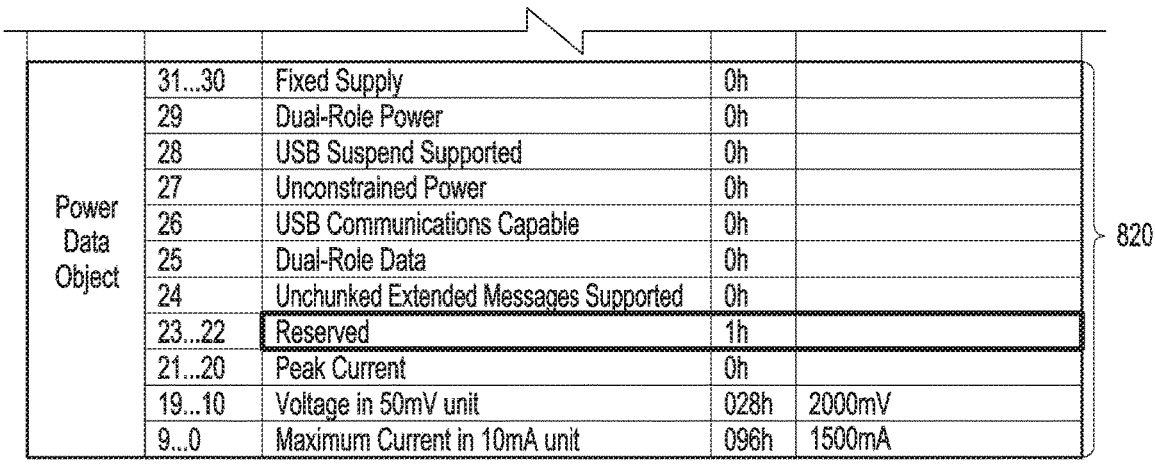
FIG. 8D illustrates one or more pieces of power information carried on a PD message according to various embodiments of the disclosure.

FIG. 8D illustrates one or more pieces of power information carried on a PD message according to various embodiments of the disclosure.

Figure 8E:
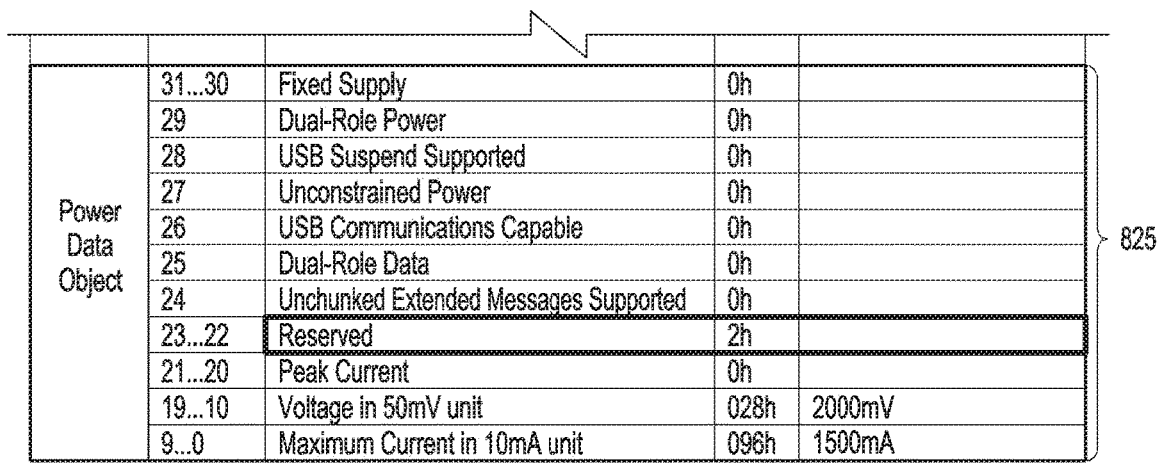
FIG. 8E illustrates one or more pieces of power information carried on a PD message according to various embodiments of the disclosure.

FIG. 8E illustrates one or more pieces of power information carried on a PD message according to various embodiments of the disclosure.

FIG. 8F illustrates one or more pieces of power information carried on a PD message according to various embodiments of the disclosure.

Referring to FIGS. 8A to 8F, one or more pieces of power information that can be supported by the host device are illustrated, and at least some of the one or more pieces of power information may be used to identify the type of the host device.

First, FIGS. 8A to 8C illustrate the case in which predetermined power information for identifying the host device is configured in a field (for example, "Voltage in 50 mV units" and "Maximum Current in 10 mA units" 750 of FIG. 7A) in which a voltage value and a current value of a data-object-related field are configured.

Referring to FIG. 8A, the PD message may include a message header 715 and a plurality of data-object-related fields (hereinafter, PDOs) 720. Values used to determine actual power may be carried on a PDO 805 and predetermined values for identifying the host device may be carried on another PDO 810. For example, if the voltage value is 5.05V (5050 mV) and the current value is 0.01 A (10 mA), as in the PDO 810, the client device may recognize that the type of the host device is device "A". Further, if the voltage value is 19.05V (19050 mV) and the current value is 0.03 A (30 mA) in a PDO 815, as illustrated in FIG. 8B, the client device may recognize that the type of the host device is device "B".

FIGS. 8A and 8C illustrate the case in which one of the one or more PDOs is used to configure predetermined power information for identifying the host device, but at least some of the one or more PDOs, for example, two or more PDOs, may be used to configure predetermined power information for identifying the host device, as illustrated in FIG. 8C. For example, when the case in which the voltage value is 5.05V (5050 mV) and the current value is 0.01 A (10 mA) and the case in which voltage value is 19.05V (19050 mV) and the current value is 0.03 A (30 mA) are simultaneously configured in two PDOs 817 of FIG. 8C, the client device may recognize that the type of the host device is device "C".

FIGS. 8D and 8E illustrate the case in which power information for identification using a "Reserved" field (for example, "Reserved" 745 of FIG. 7A) of the data-object-related field is configured. As illustrated in FIG. 8D, it is possible to identify the type of the host device by configuring a nonzero value in a "Reserved" field of a PDO 820. For example, as illustrated in FIG. 8D, when the "Reserved" field is configured as "1h", the client device may recognize that the type of the host device is device "A". Further, as illustrated in FIG. 8E, when a "Reserved" field of a PDO 825 is configured as "2h", the client device may recognize that the type of the host device is device "B".

Meanwhile, although one PDO is used in the above description, power information for identifying the type of the host device may be configured using a combination of two or more PDOs, as illustrated in FIG. 8F. FIG. 8F illustrates the case in which supportable actual power information is carried on some PDOs 830 of the plurality of PDOs 720 and predetermined power information for identifying the type of the host device is carried on a PDO 835. As illustrated in FIG. 8F, when a nonzero value is configured in the "Reserved" field, for example, when the "Reserved" field is "1h", the voltage value is 5.05V (5050 mV), and the current value is 0.01 A (10 mA), the client device may recognize that the type of the host device is device "C". As described above, if the field (for example, "Voltage in 50 mV units" and "Maximum Current in 10 mA units" 750 of FIG. 7A) in which the voltage value and the current value are configured and the "Reserved" field (for example, "Reserved" 745 of FIG. 7A) of the data-object-related field are used, the configuration of the current value and the voltage value for predetermined power information may vary greatly, and thus it may be possible to identify various types of host devices.

Figure 9:
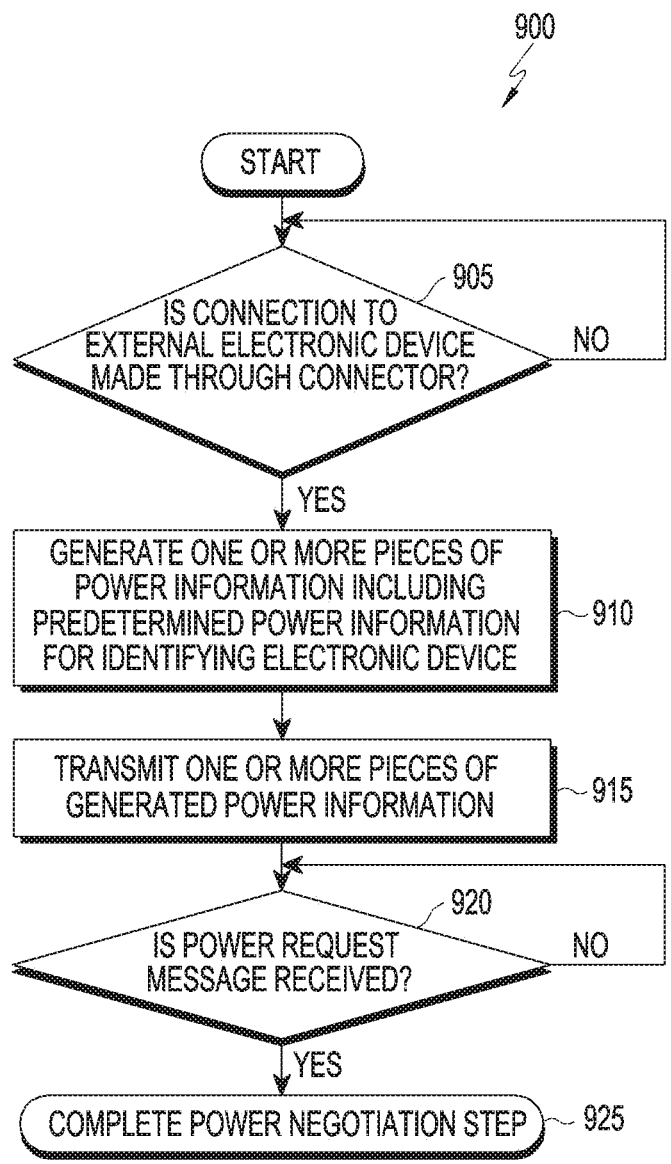
FIG. 9 is a flowchart illustrating a method of operating a host device according to various embodiments of the disclosure.

FIG. 9 is a flowchart illustrating a method of operating a host device according to various embodiments of the disclosure.

The operation method 900 may include operations 905 to 925. Each step/operation of the operation method may be performed by at least one of an electronic device (for example, the electronic device 101 or 420 or at least one processor (for example, the processor 120 or 424 of the electronic device) and an identification circuit (for example, the identification circuit 426) of the electronic device. According to an embodiment, at least one of operations 905 to 925 may be omitted, the sequence of some operations may be changed, or other operations may be added.

Referring to FIG. 9, in operation 905, the electronic device (for example, the host device) may determine whether an external electronic device (for example, a client device) is connected through a connector. If the external electronic device is connected through the connector, one or more pieces of power information including predetermined power information for identifying the electronic device may be generated in operation 910. According to an embodiment, the one or more pieces of power information may be transmitted using a source capability message based on Universal Serial Bus (USB) Power Delivery (PD) communication.

Subsequently, the electronic device may transmit the one or more pieces of generated power information to the external electronic device in operation 915. According to an embodiment, the one or more pieces of power information may include not only predetermined power information for identifying the electronic device but also one or more pieces of information about power that can be supported by the electronic device. The electronic device may receive a power request message including the selected power information from the external electronic device in operation 920, and thus a power negotiation step may be completed in operation 925. The selected power information may be one or more pieces of power information selected by the external electronic device from among one or more pieces of information about power that can be supported by the electronic device.

According to an embodiment, a message in which the one or more pieces of power information are carried is a source capability message, the source capability message may include at least one of a message header including a field related to the number of data objects and a field related to a message type and one or more data-object-related fields, and the predetermined power information for identifying the external electronic device may be configured in the one or more data-object-related fields.

Figure 10:
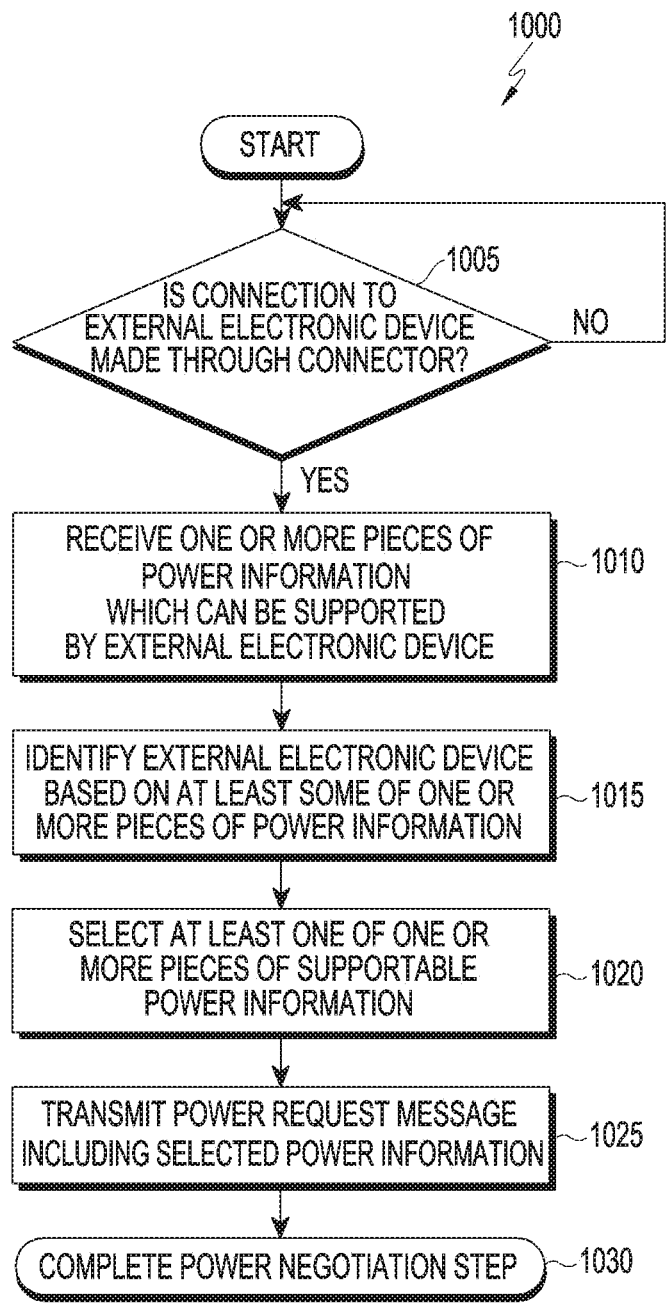
FIG. 10 is a flowchart illustrating a method of operating a client device according to various embodiments of the disclosure.

FIG. 10 is a flowchart illustrating a method of operating a client device according to various embodiments of the disclosure.

The operation method 1000 may include operations 1005 to 1030. Each step/operation of the operation method may be performed by at least one of an electronic device (for example, the electronic device 101 or 410) or at least one processor (for example, the processor 120 or 415) of the electronic device) and an identification circuit (for example, the identification circuit 416) of the electronic device. According to an embodiment, at least one of operations 1005 to 1030 may be omitted, the sequence of some operations may be changed, or other operations may be added.

Referring to FIG. 10, the electronic device (for example, a client device) may identify the connection to the external electronic device through a connector including one or more signal terminals for communication with the external electronic device (for example, a host device) in operation 1005. In the connection to the external electronic device through the connector including one or more signal terminals for communication with the external electronic device, the electronic device may receive one or more pieces of information about power that can be supported by the external electronic device from the external electronic device in operation 1010. According to an embodiment, the one or more pieces of power information may be transmitted using a source capability message based on Universal Serial Bus (USB) Power Delivery (PD) communication. According to an embodiment, the source capability message may include at least one of a message header, including a field related to the number of data objects, a field related to a message type, and one or more data-object-related fields, and the predetermined power information for identifying the external electronic device may be configured in the one or more data-object-related fields.

The electronic device may identify the external electronic device on the basis of at least some of the one or more pieces of power information in operation 1015.

According to an embodiment, the one or more pieces of power information may include not only predetermined power information for identifying the external electronic device but also one or more pieces of information about power that can be supported by the external electronic device. The predetermined power information may include at least one of a predetermined current value and a predetermined voltage value for identifying the external electronic device.

According to an embodiment, the operation of identifying the external electronic device may include an operation of identifying predetermined power information for identifying the external electronic device among the one or more pieces of power information and an operation of identifying the type of the external electronic device operating as the host on the basis of the predetermined power information.

In operation 1020, the electronic device may select at least one piece of power information from among the one or more pieces of information about power that can be supported by the external electronic device. After transmitting a power request message including the selected power information to the external electronic device in operation 1025, the electronic device may receive a power supply preparation message from the external electronic device and may perform power negotiation on the basis of the received power supply preparation message in operation 1030. When the power negotiation step is completed, the electronic device may enter an alternative mode.

Figure 11A:
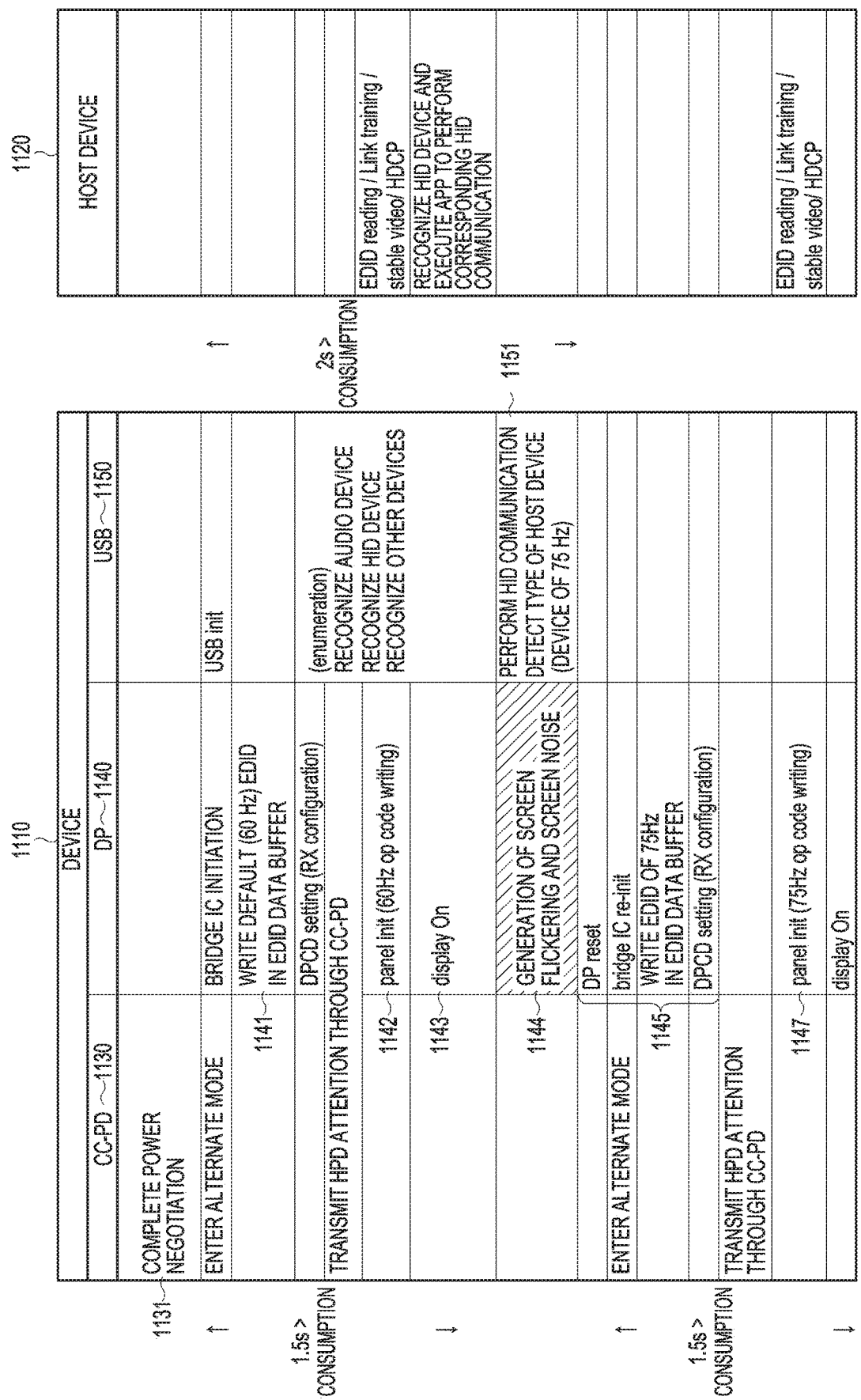
FIG. 11A illustrates an operation for video communication in a client device after a power negotiation step and during the power negotiation step according to various embodiments of the disclosure.

FIG. 11A illustrates an operation for video communication in a client device after a power negotiation step and during a power negotiation step according to various embodiments of the disclosure.

Figure 11B:
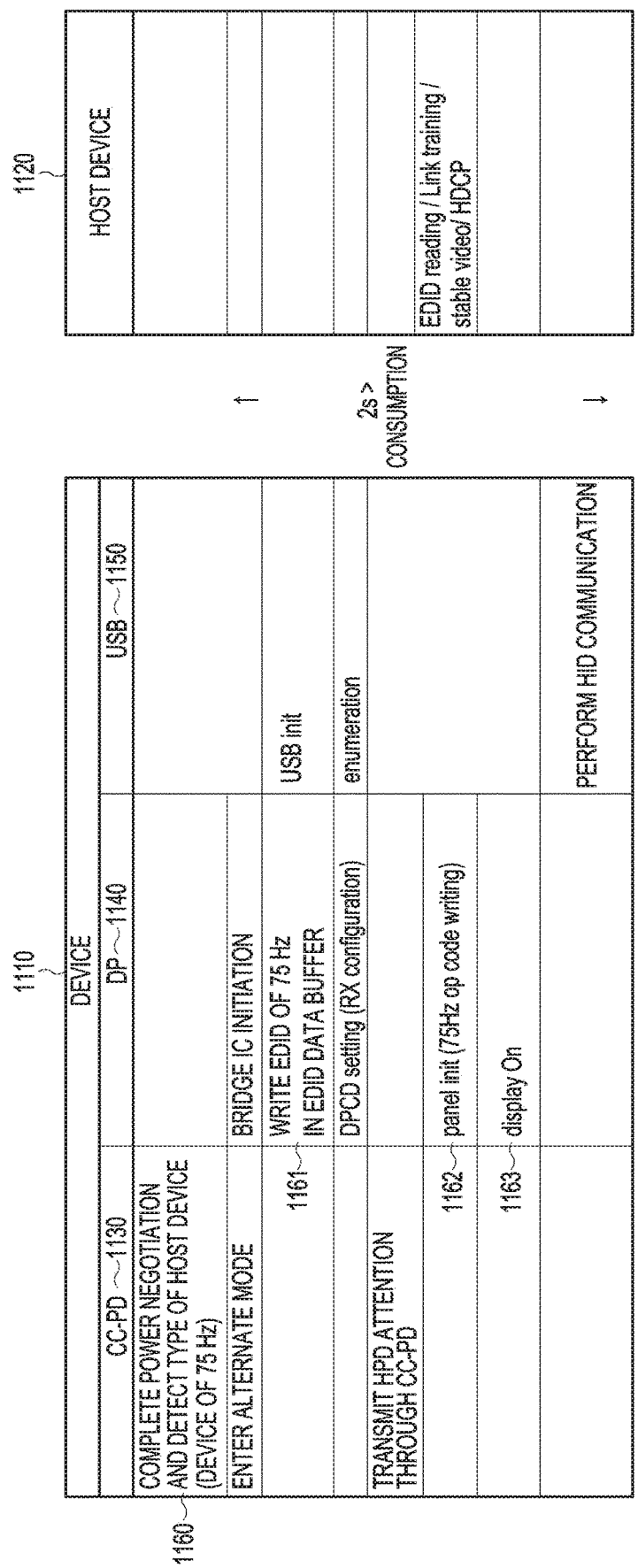
FIG. 11B illustrates an operation for video communication in the client device after the power negotiation step and in the power negotiation step according to various embodiments of the disclosure.

FIG. 11B illustrates an operation for video communication in a client device after a power negotiation step and during a power negotiation step according to various embodiments of the disclosure.

Referring to FIGS. 11A and 11B, when the electronic device (or the client device) (for example, a TV) desires to use different refresh rates in the panel of the electronic device depending on the connected host device, the electronic device is required to rapidly identify the type of the connected host device. For example, default settings of the electronic device may vary, such as a default setting of 75 Hz for connection to a terminal having a high-performance GPU, a default setting of 60 Hz for connection to a terminal having a low-performance GPU, and a default setting of 75 Hz for connection to a PC.

When the client device desires to identify the type of the host device connected through USB communication, communication is possible after the client device first recognizes a USB device and executes an application to perform corresponding HID communication, and the USB device recognition may be completed later than a CC-PD and a Delivery Port (DP). For example, as illustrated in FIG. 11A, when a client device 1110 enters an alternate mode after completing power negotiation through a CC-PD 1130, as indicated by reference numeral 1131, a default EDID of 60 Hz may be written in an EDID data buffer through a DP 1140, as indicated by reference numeral 1141. Accordingly, panel initiation 1142 may be performed with the default EDID of 60 Hz, and then the display is turned on 1143 to turn on the screen. At this time, when the video frame rate of the actually connected host device is 75 Hz, it does not match the default refresh rate of the panel, and thus a pixel damage phenomenon, such as screen flickering or screen noise, may be generated, as indicated by reference numeral 1144. Meanwhile, an operation 1151 of detecting the type of the host device via USB 1150 may be performed, and thus it may be identified that the video frame rate of the connected host device is 75 Hz. Thereafter, when a change to a display setting matching the connected host device is made, the DP 1140 is reset, 75 Hz of the video frame rate of the actually connected host device is written in an EDID data buffer, as indicated by reference numeral 1145, and then panel initiation 1147 is set as 75 Hz, and as a result a normal screen is turned on.

As described above, when a change to the display setting matching the connected host device is made, DP reconnection and panel re-initiation are required, in which case it takes almost the same amount of time as initial connection due to the DP reconnection and the panel re-initiation.

If turning on of the display is not performed after panel initiation, but the client device 1110 waits until identification of the host device 1120 through HID communication is completed due to concern about a pixel damage phenomenon in the case in which the default video frame rate does not match, a display-on-response-rate may always be slow.

However, according to various embodiments of the disclosure, the client device may identify the type of the host device during a power negotiation process through the CC-PD 1130 performing first communication in initial connection between the client device 1110 and the host device 1120, as indicated by reference numeral 1160 in FIG. 11B. Accordingly, the client device may determine a video frame rate corresponding to the identified type of host device, write the determined video frame rate, for example, an EDID of 75 Hz, in an EDID data buffer, as indicated by reference numeral 1161, and turn on the display using op code at 75 Hz in panel initiation 1162, as indicated by reference numeral 1163. Therefore, various peripheral devices can be initiated at one time by the default setting, whereby a response rate may be minimized. In addition, a possibility of momentary malfunction due to setting mismatch between the host device and the client may be removed.

Figure 12A:
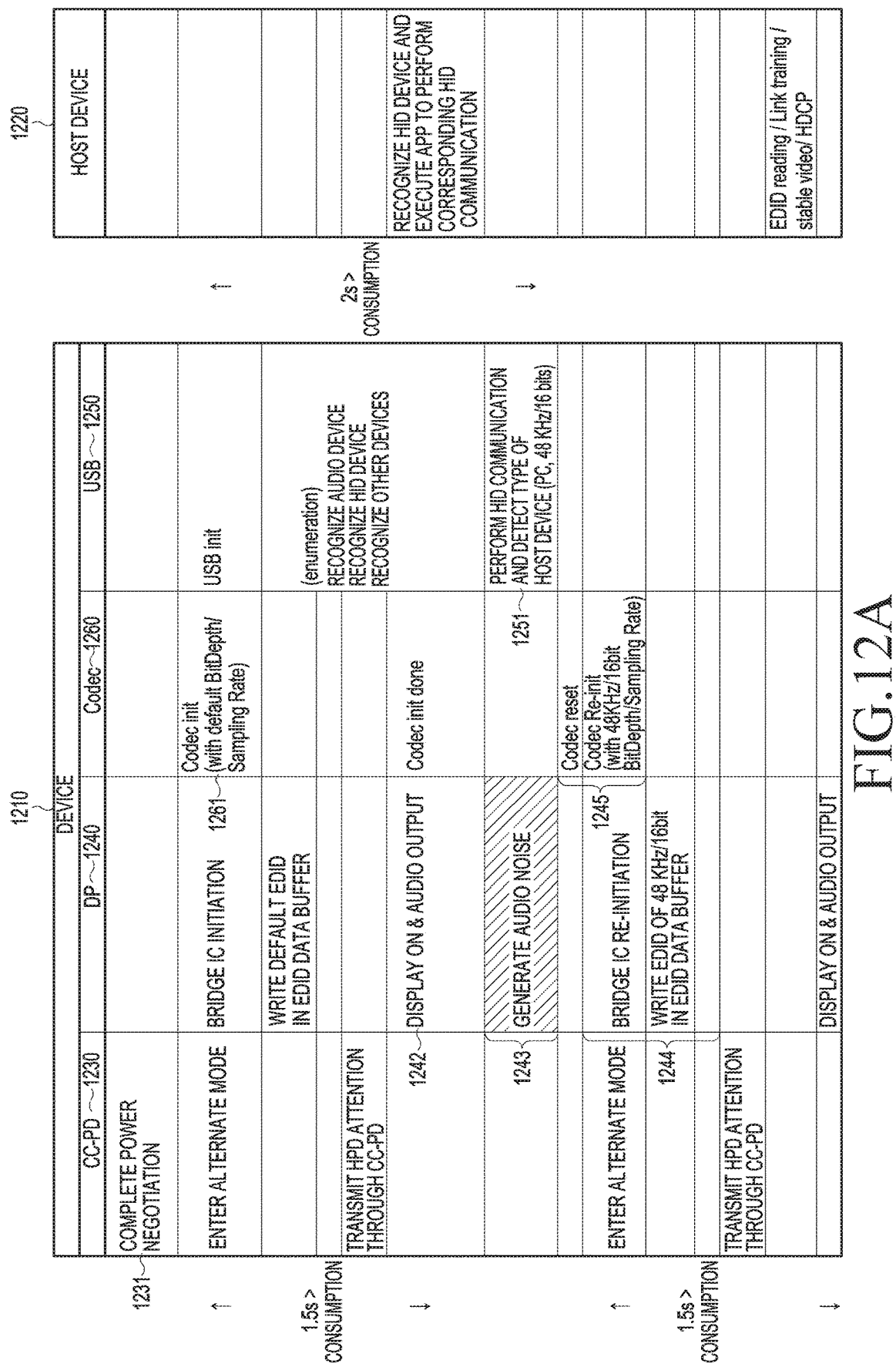
FIG. 12A illustrates an operation for audio communication in the client device after the power negotiation step and in the power negotiation step according to various embodiments of the disclosure.

FIG. 12A illustrates an operation for audio communication in the client device after the power negotiation step and in the power negotiation step according to various embodiments of the disclosure.

FIG. 12B illustrates an operation for audio communication in the client device after the power negotiation step and in the power negotiation step according to various embodiments of the disclosure.

Referring to FIG. 12A, it is similar to the operation in FIG. 11A but has a difference therefrom in that FIG. 12A illustrates the case of audio settings. For example, when the audio sampling rate that can be output by the host device does not match the codec setting of the device, there may be the risk of noise occurrence. Accordingly, after a power negotiation step through a CC-PD 1230, a default EDID of 192 Khz/24 bits may be written in an EDID data buffer. In this case, when the display and audio output are turned on 1242, audio noise may be generated as indicated by reference numeral 1243. For example, an audio signal may be cut off or a device connection sound may not be generated. In the meanwhile, the type of the host device may be identified via USB 1250, as indicated by reference numeral 1251, and, for example, when the host device is a PC and operates at 48 Khz/16 bits, codec re-initiation is performed at 48 Khz/16 bits through a codec 1260 as indicated by reference numeral 1245. Accordingly, information indicating 48 Khz/16 bits may be written in an EDID data buffer through the DP 1240 as indicated by reference numeral 1244, the display may be turned on, and a normal audio signal may be output.

As described above, if the display is turned on with the default setting and a change to an audio setting suitable for the connected host device is made while the audio signal is output, DP reconnection (the case in which the audio capability of the device should be newly transmitted) and codec re-initiation may be needed. The DP reconnection and the codec re-initiation may take an amount of time similar to initial connection. If turning on of an amplifier is not performed immediately after initiation, but the client device 1210 waits until the type of the host device is identified through HID communication due to concern about noise in the case in which the audio sampling rate does not match, an audio response rate may be slow.

Referring to FIG. 12B, the client device 1210 may detect the type of the host device through the CC-PD 1230 in the power negotiation step, as indicated by reference numeral 1264, and accordingly, the client device may determine the audio sampling rate corresponding to the identified type of the host device. For example, when the identified host device is a PC, codec initiation 1263 may be performed at 48 Hz/16 bits through the codec 1260, an EDID of 48 Hz/16 bits may be written in an EDID data buffer, as indicated by reference numeral 1261, and the display may be turned on and an audio signal may be output, as indicated by reference numeral 1262, without audio noise according to a delay due to mismatch of the audio sampling rate. Therefore, various peripheral devices can be initiated at one time by the default setting, whereby a response rate may be minimized. In addition, the possibility of momentary malfunction due to setting mismatch between the host device and the client may be eliminated.

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments disclosed herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include a code that is generated or executed by a compiler or interpreter. The machine-readable storage media may be provided in the form of non-transitory storage media. Here, the term "non-transitory" only means that the storage media is tangible without including a signal, irrespective of whether data is semi-permanently or transitorily stored in the storage media.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware electronic device may be configured to operate as one or more software modules in order to perform the operation of the disclosure, and vice versa.

The programming module according to the disclosure may include one or more of the aforementioned components or may further include other additional components, or some of the aforementioned components may be omitted. Operations executed by a module, a programming module, or other component elements according to various embodiments of the disclosure may be executed sequentially, in parallel, repeatedly, or in a heuristic manner. Furthermore, some operations may be executed in a different order or may be omitted, or other operations may be added.

According to various embodiments, a storage medium having instructions stored therein is provided. The instructions may be configured to cause at least one processor to, when executed by the at least one processor, perform at least one operation. The at least one operation may include an operation of identifying a connection to an external electronic device through a connector including one or more signal terminals for communication with the external electronic device, an operation of receiving one or more pieces of information about power that can be supported by the external electronic device from the external electronic device in the connection to the external electronic device through the connector, and an operation of identifying the external electronic device, based on at least some of the one or more pieces of power information.

Various embodiments of the disclosure disclosed in this specification and the drawings are merely specific examples presented in order to easily describe technical details of the disclosure and to help the understanding of the disclosure, and are not intended to limit the scope of the disclosure. Therefore, it should be construed that, in addition to the embodiments disclosed herein, all modifications and changes or modified and changed forms derived from the technical idea of various embodiments of the disclosure fall within the scope of the disclosure.

What is claimed is:

1. An electronic device comprising:
   a connector comprising one or more signal terminals for communication with an external electronic device;
   at least one processor operatively connected to the connector; and
   a memory operatively connected to the at least one processor, wherein the memory stores instructions, when executed by the at least one processor, cause the at least one processor to:
- identify a connection to the external electronic device through the connector, the external electronic device operating as a host and the electronic device operating as a client,
- receive, from the external electronic device via the connection, prior to completion of a power negotiation step, a source capability message including one or more pieces of information about power supported by the external electronic device in a form of power data objects (PDO) and predetermined information for identifying the external electronic device operating as the host in the form of PDO, and
- identify a type of the external electronic device, based on the electronic device and the external electronic device being configured to switch roles and the predetermined information without switching roles of the external electronic device operating as the host and the electronic device operating as the client in order to identify the type of the external electronic device, and wherein the predetermined information includes at least one of a predetermined current value or a predetermined voltage value for identifying the type of the external electronic device as the host.

2. The electronic device of claim 1, wherein the source capability message is a universal serial bus (USB) power delivery (PD) communication-based source capability message.

3. The electronic device of claim 2, wherein the source capability message comprises at least one of a message header including a number of data objects and a message type and one or more data objects, or the predetermined information for identifying the external electronic device operating as the host is configured in the one or more data objects.

4. The electronic device of claim 1, wherein the instructions, when further executed by the at least one processor, cause the at least one processor to:
- select at least one piece of information about power among the received one or more pieces of information about power supported by the external electronic device, and
- transmit a power request message comprising the selected at least one piece of information about power to the external electronic device.

5. The electronic device of claim 4, wherein the instructions, when further executed by the at least one processor, cause the at least one processor to:
- receive a power supply preparation message from the external electronic device after transmitting the power request message,
- perform power negotiation, based on the received power supply preparation message, and
- enter an alternate mode when the power negotiation is completed.

6. The electronic device of claim 1, wherein at least some operations of the at least one processor are performed by a configuration channel (CC) power delivery (PD) integrated circuit (IC).

7. A method of identifying an external electronic device by an electronic device, based on information about power, the method comprising:
- identifying a connection to the external electronic device through a connector comprising one or more signal terminals for communication with the external electronic device, the external electronic device operating as a host and the electronic device operating as a client;
- receiving, from the external electronic device in the connection to the external electronic device through the connector, prior to completion of a power negotiation step, a source capability message including one or more pieces of information about power supported by the external electronic device in a form of power data objects (PDO) and predetermined information for identifying the external electronic device operating as the host in the form of PDO; and
- identifying a type of the external electronic device, based on the electronic device and the external electronic device being configured to switch roles and the predetermined information without switching roles of the external electronic device operating as the host and the electronic device operating as the client in order to identify the type of the external electronic device, wherein the predetermined information includes at least one of a predetermined current value or a predetermined voltage value for identifying the type of the external electronic device as the host.

8. The method of claim 7, wherein the source capability message is a universal serial bus (USB) power delivery (PD) communication-based source capability message.

9. The method of claim 8, wherein the source capability message comprises at least one of a message header including a number of data objects and a message type and one or more data objects, or the predetermined information for identifying the external electronic device operating as the host is configured in the one or more data objects.

10. The method of claim 7, further comprising:
- selecting at least one piece of information about power among the received one or more pieces of information about power which is supported by the external electronic device;
- transmitting a power request message comprising the selected at least one piece of information about power to the external electronic device;
- receiving a power supply preparation message from the external electronic device after the transmitting of the power request message;
- performing power negotiation, based on the received power supply preparation message; and
- entering an alternate mode when the power negotiation is completed.

11. An electronic device comprising:
- a connector comprising one or more signal terminals for communication with an external electronic device;
- at least one processor operatively connected to the connector; and
- a memory operatively connected to the at least one processor, wherein the memory stores instructions, when executed by the at least one processor, cause the at least one processor to:
- identify a connection to the external electronic device through the connector, the electronic device operating as a host and the external electronic device operating as a client,
- transmit a source capability message including one or more pieces of information about power supported by the electronic device in a form of power data objects (PDO) and predetermined information for identifying the electronic device operating as the host to the external electronic device in the form of PDO in the connection to the external electronic device through the connector without switching roles of the electronic device operating as the host and the external electronic device operating as the client in order to identify a type of the electronic device, the electronic device and the external electronic device being configured to switch roles, transmit a power supply preparation message when a power request message includes selected information about power is received from the external electronic device, the power request message being generated by the external electronic device based upon the transmitted one or more pieces of information about power, and perform a power negotiation step, based on the power request message, and wherein the predetermined information includes at least one of a predetermined current value or a predetermined voltage value for identifying the type of the electronic device as the host.

12. The electronic device of claim 11, wherein the source capability message is transmitted using a universal serial bus (USB) power delivery (PD) communication-based source capability message, the source capability message comprises at least one of a message header including a number of data objects and a message type and one or more data-objects, or the predetermined information for identifying the external electronic device operating as the host is configured in the one or more data-objects.

13. A method of identifying an external electronic device by an electronic device, based on information about power, the method comprising:

identifying a connection to the external electronic device through a connector comprising one or more signal terminals, the electronic device operating as a host and the external electronic device operating as a client;

transmitting a source capability message including one or more pieces of information about power supported by the electronic device in a form of power data objects (PDO) and predetermined information for identifying the electronic device operating as the host in the form of PDO to the external electronic device in the connection to the external electronic device through the connector without switching roles of the electronic device operating as the host and the external electronic device operating as the client in order to identify a type of the electronic device, the electronic device and the external electronic device being configured to switch roles;

transmitting a power supply preparation message when a power request message including selected information about power is received from the external electronic device, the power request message being generated by the external electronic device based upon the transmitted one or more pieces of information about power; and performing a power negotiation step, based on the power request message, wherein the predetermined information includes at least one of a predetermined current value or a predetermined voltage value for identifying the type of the electronic device as the host.

14. The method of claim 13, wherein the transmitted one or more pieces of information about power are transmitted using universal serial bus (USB) a power delivery (PD) communication-based source capability message, the source capability message comprises at least one of a message header including a number of data objects and a message type and one or more data objects, or the predetermined information for identifying the external electronic device operating as the host is configured in the one or more data objects.

15. A non-transitory storage medium having instructions stored therein, the instructions being configured to cause at least one circuit, when executed by the at least one circuit, to perform at least one operation, the at least one operation comprising:

identifying a connection to an external electronic device through a connector comprising one or more signal terminals for communication with the external electronic device, the external electronic device operating as a host and the electronic device operating as a client;

receiving, from the external electronic device in the connection to the external electronic device through the connector, prior to completion of a power negotiation step, a source capability message including one or more pieces of information about power supported by the external electronic device in a form of power data objects (PDO) and predetermined information for identifying the external electronic device operating as the host in the form of PDO; and identifying a type of the external electronic device based on the electronic device and the external electronic device being configured to switch roles and the predetermined information without switching roles of the external electronic device operating as the host and an electronic device operating as the client in order to identify the type of the external electronic device, wherein the predetermined information includes at least one of a predetermined current value or a predetermined voltage value for identifying the type of the external electronic device as the host.

16. The non-transitory storage medium of claim 15, wherein the source capability message is a universal serial bus (USB) power delivery (PD) communication-based source capability message, the source capability message includes at least one of a message header comprising a number of data objects and a message type and one or more data objects, or the predetermined information for identifying the external electronic device operating as the host is configured in the one or more data objects.

* * * * *